US009056548B2

(12) United States Patent
Kiyokawa et al.

(10) Patent No.: US 9,056,548 B2
(45) Date of Patent: Jun. 16, 2015

(54) WORK VEHICLE

(71) Applicant: Iseki & Co., Ltd., Ehime-ken (JP)

(72) Inventors: Tomoo Kiyokawa, Ehime-ken (JP);
Noboru Sagawa, Ehime-ken (JP);
Fumiaki Nishikawa, Ehime-ken (JP);
Tatsuzo Murakami, Ehime-ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 0 days.

(21) Appl. No.: 14/027,018

(22) Filed: Sep. 13, 2013

(65) Prior Publication Data
US 2014/0076073 A1    Mar. 20, 2014

(30) Foreign Application Priority Data

Sep. 14, 2012  (JP) ................................ 2012-203380
Aug. 8, 2013  (JP) ................................ 2013-165199

(51) Int. Cl.
*B60K 17/28* (2006.01)
*B60K 25/06* (2006.01)
*B60K 17/344* (2006.01)
*B60K 23/08* (2006.01)

(52) U.S. Cl.
CPC ............. *B60K 25/06* (2013.01); *B60K 17/28* (2013.01); *B60K 17/344* (2013.01); *B60K 23/08* (2013.01); *B60Y 2200/221* (2013.01)

(58) Field of Classification Search
CPC ............................. B60K 17/28; B60K 25/06
USPC ........................................ 74/15.2; 180/53.1
See application file for complete search history.

(56) References Cited

U.S. PATENT DOCUMENTS

| 2,548,182 | A | * | 4/1951 | Wagner | 74/15.2 |
|---|---|---|---|---|---|
| 2,636,390 | A | * | 4/1953 | Wagner | 74/15.2 |
| 2,731,838 | A | * | 1/1956 | Wagner | 74/15.2 |
| 2,798,382 | A | * | 7/1957 | Fletcher et al. | 74/473.24 |
| 2,838,940 | A | * | 6/1958 | Swenson et al. | 74/15.2 |
| 2,975,643 | A | * | 3/1961 | Ferguson | 74/15.2 |
| 3,074,285 | A | * | 1/1963 | Hausmann | 74/15.2 |
| 4,078,626 | A | * | 3/1978 | Weichel | 111/131 |
| 4,184,558 | A | * | 1/1980 | de Buhr et al. | 180/14.1 |

(Continued)

FOREIGN PATENT DOCUMENTS

| JP | 56160222 A | * | 12/1981 | ............. B60K 17/28 |
|---|---|---|---|---|
| JP | 57033024 A | * | 2/1982 | ............. B60K 17/28 |

(Continued)

*Primary Examiner* — Paul N Dickson
*Assistant Examiner* — Laura Freedman
(74) *Attorney, Agent, or Firm* — Finnegan, Henderson, Farabow, Garrett & Dunner, L.L.P.

(57) ABSTRACT

Systems and methods are disclosed for improving operability of a work vehicle. In accordance with one implementation, a work vehicle is disclosed. The work vehicle includes a first PTO shaft and a second PTO shaft, the first and second PTO shafts being removably mounted to a vehicle body rear structure and fitted to a power receiving unit on an implement side. The work vehicle also includes a PTO drive mechanism comprising a PTO transmission mechanism, the PTO drive mechanism transmitting rotational power from a power source to the first PTO shaft, and a storage unit storing the second PTO shaft. The work vehicle further includes a PTO transmission operation lever allowing a transmission operation to be performed on the PTO transmission mechanism, wherein the PTO transmission operation lever and the storage unit are provided in the vehicle body rear structure.

8 Claims, 24 Drawing Sheets

(56) References Cited

U.S. PATENT DOCUMENTS

| | | | | |
|---|---|---|---|---|
| 4,215,586 | A | * | 8/1980 | Morris, Sr. .................... 74/15.2 |
| 4,304,141 | A | * | 12/1981 | Tone et al. .................... 74/15.2 |
| 4,585,084 | A | * | 4/1986 | van der Lely ............... 180/53.1 |
| 4,880,070 | A | * | 11/1989 | Irikura ........................ 180/53.1 |
| 5,046,994 | A | * | 9/1991 | Hasegawa et al. ............. 475/83 |
| 5,099,936 | A | * | 3/1992 | Irikura et al. ............... 180/53.1 |
| 5,937,697 | A | * | 8/1999 | Matsufuji ........................ 74/11 |
| 2014/0076103 | A1 | * | 3/2014 | Sagawa et al. ............... 74/665 F |

FOREIGN PATENT DOCUMENTS

| | | | | |
|---|---|---|---|---|
| JP | 58174021 | A | * 10/1983 | ............. B60K 17/28 |
| JP | 02270639 | A | * 11/1990 | ............. B60K 17/28 |
| JP | 02274627 | A | * 11/1990 | ............. B60K 17/28 |
| JP | 2008184120 | | 8/2008 | |

* cited by examiner

WORK VEHICLE

CROSS REFERENCE TO RELATED APPLICATIONS

This application claims priority to Japanese Patent Application No. 2013-165199, filed Aug. 8, 2013, which claims priority to Japanese Patent Application No. 2012-203380, filed Sep. 14, 2012, the disclosures of both of which are incorporated herein by reference in their entirety.

BACKGROUND

Work vehicles such as tractors can include elements such as a backhoe hydraulic pump which hydraulically operates a hydraulic cylinder of a backhoe mounted to a rear section of the vehicle body. The hydraulic pump can be attached to an outer side surface of a transmission case. Conventional work vehicles can also include a power take-off (PTO) gang shaft that drives the hydraulic pump by using a gang mechanism, where the application and cessation of the driving force to the PTO gang shaft is conducted via a PTO clutch in the transmission case. Exemplary embodiments of such a work vehicle are described in Japanese Laid-open Patent Publication No. 2008-184120.

Different PTO shafts can be used to output the rotational power from a power source to an implement, depending on the drive power and the type of implement being used. Improvements in the PTO shaft can increase the operability of the work vehicle.

BRIEF DESCRIPTION OF THE DRAWINGS

Reference will now be made to the accompanying drawings which illustrate exemplary embodiments of the present disclosure. In the drawings.

DESCRIPTION OF EXEMPLARY EMBODIMENTS

Figure 1:
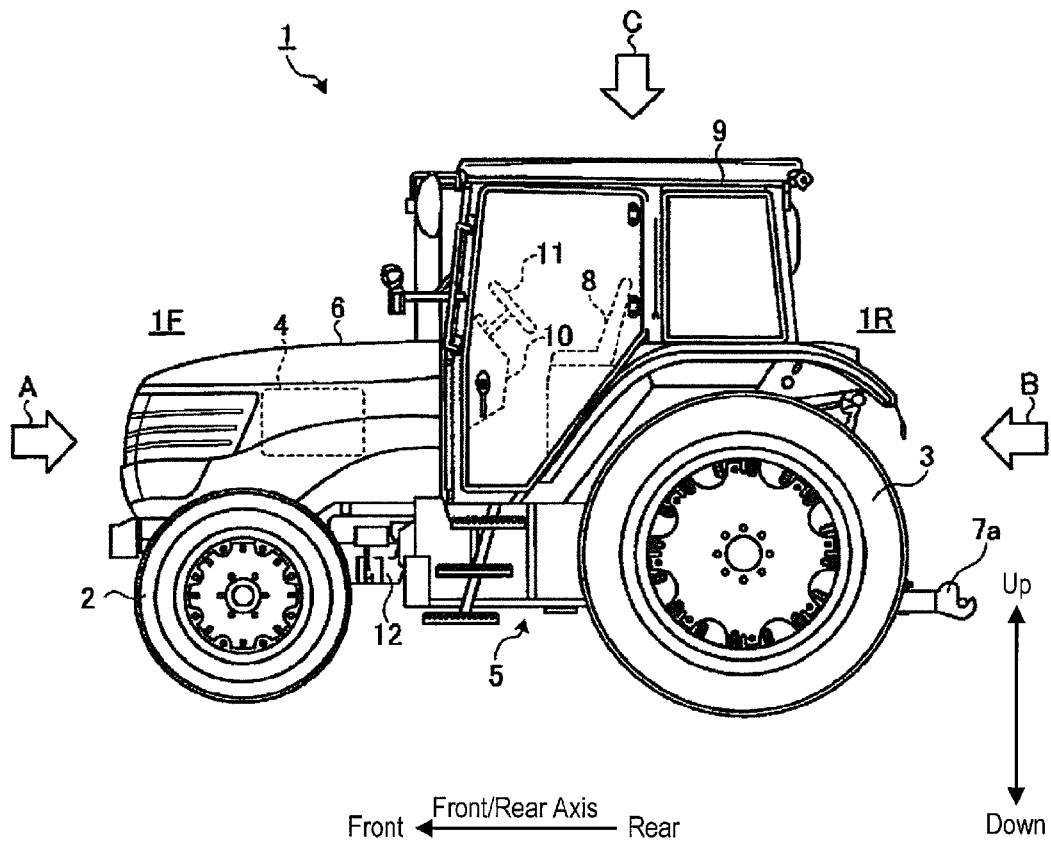
FIG. 1 shows an exemplary work vehicle, consistent with embodiments of the present disclosure.
Figure 2:
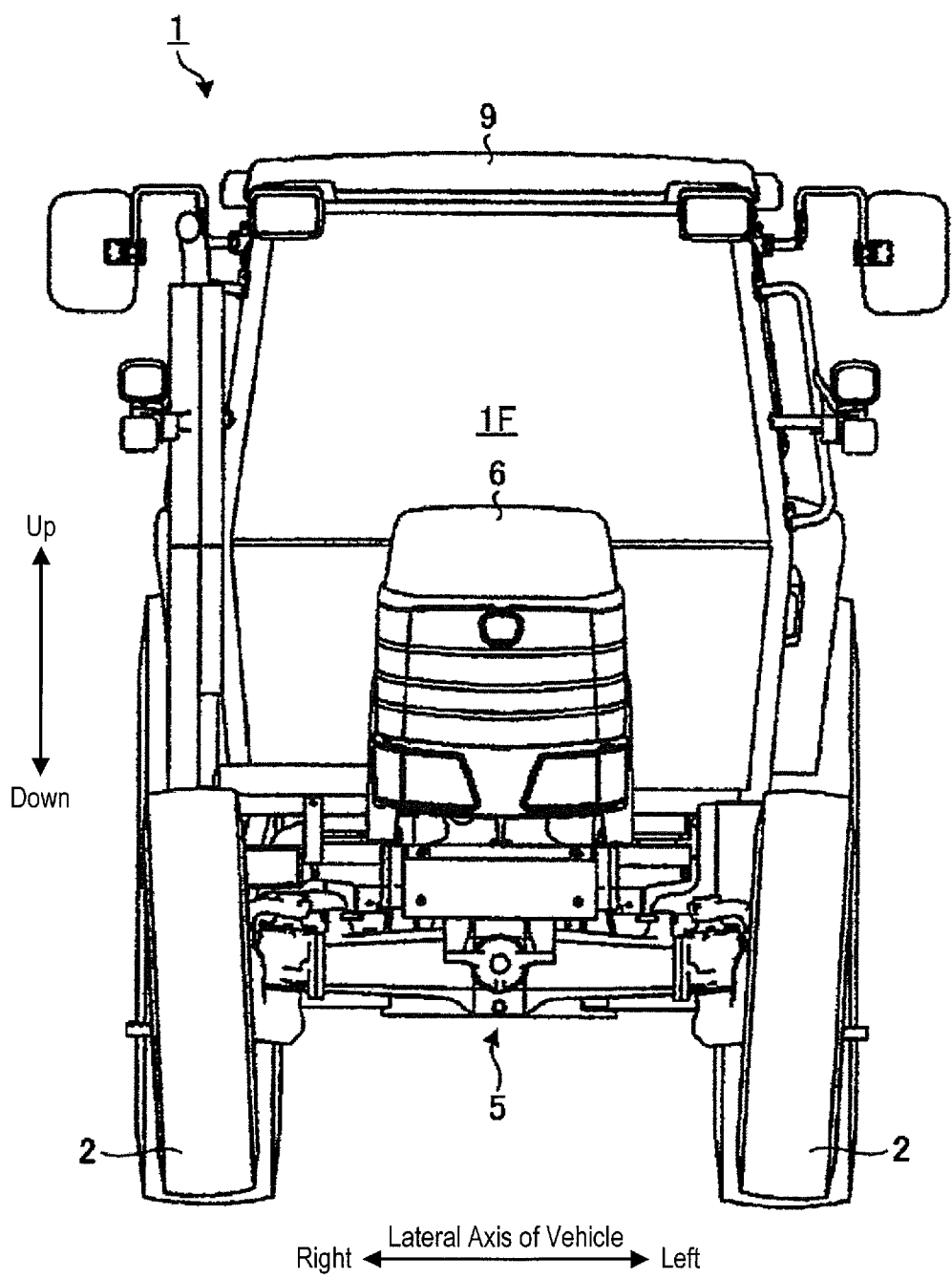
FIG. 2 is a drawing of the exemplary work vehicle of FIG. 1, as seen from the front of the vehicle body (i.e., from arrow A)

Reference will now be made in detail to several exemplary embodiments of the present disclosure, including those illustrated in the accompanying drawings. Whenever possible, the same reference numbers will be used throughout the drawings to refer to the same or like parts.

In the present disclosure, references to the front/rear axis refer to the front/rear axis of a work vehicle. Furthermore, the front/rear axis relates to the direction of the work vehicle when it is moving forward, with the direction of the motion being the front of the front/rear axis, and the opposite direction being the back of the front/rear axis. The direction of the work vehicle's motion refers to the direction from a driver's seat to a steering wheel when the work vehicle is moving forward, with the side toward the steering wheel being the front side and the side toward the driver's seat being the rear side. The lateral axis of the work vehicle refers to a horizontal axis perpendicular to the front/rear axis. References to the right side of the lateral axis of the work vehicle refer to the right side when one is facing the front of the front/rear axis, and references to the left side of the lateral axis of the work vehicle refer to the left side when one is facing the front of the front/rear axis. Furthermore, the vertical axis is the axis perpendicular to the front/rear axis and the lateral axis of the vehicle. The front/rear axis, the lateral axis of the vehicle, and the vertical axis are all perpendicular to each other.

FIGS. 1-4 show an exemplary work vehicle 1, consistent with embodiments of the present disclosure. Work vehicle 1 can be an agricultural tractor, or any other vehicle that performs work in a field or the like, while being propelled by power generated by a power source. Work vehicle 1 can be equipped with front wheels 2, back wheels 3, an engine 4 serving as the power source, and a transmission device (also referred to as transmission) 5. Front wheels 2 can be wheels that are used for steering, i.e., steerable wheels. Back wheels 3 can be wheels used for driving, i.e., drive wheels. The rotational power generated by engine 4 mounted in a bonnet 6 in a vehicle body front section 1F can be transmitted to back wheels 3 while the speed is reduced as appropriate by transmission device 5. Back wheels 3 can generate drive power from this rotational power. When necessary, transmission device 5 can also transmit the rotational power generated by engine 4 to front wheels 2, so that drive power is generated with the four wheels, that is, front wheels 2 and back wheels 3, generating drive power. In other words, transmission device 5 can be switched between a two-wheel drive mode and a four-wheel drive mode. Engine 4 can be slowed down to reduce the rotational power, and the reduced rotational power can be transmitted to front wheels 2 and back wheels 3. In addition, work vehicle 1 can be equipped with a connecting device 7 that can be used for mounting an implement, such as a rotary tiller, at the vehicle body rear 1R. Connecting device 7 can connect an implement to vehicle body rear 1R of work vehicle 1 using left and right lower links 7a, a central top link, or the like. Work vehicle 1 can raise and lower the implement by way of a lift rod 49a, lower links 7a connected to lift rod 49a, and the like, for example, by using hydraulic pressure to pivot left and right lift arms 49. Driver's seat 8 in the vehicle body of work vehicle 1 can be covered by a cabin 9. Inside cabin 9, a steering wheel 11 can be projected from a dash board 10 on the front of the driver's seat 8. Various operation pedals (for example, a clutch pedal, a brake pedal, an accelerator pedal, and the like) and various operation levers (for example, a forward/reverse lever, a transmission lever, and the like), can be provided around driver's seat 8.

Figure 5:
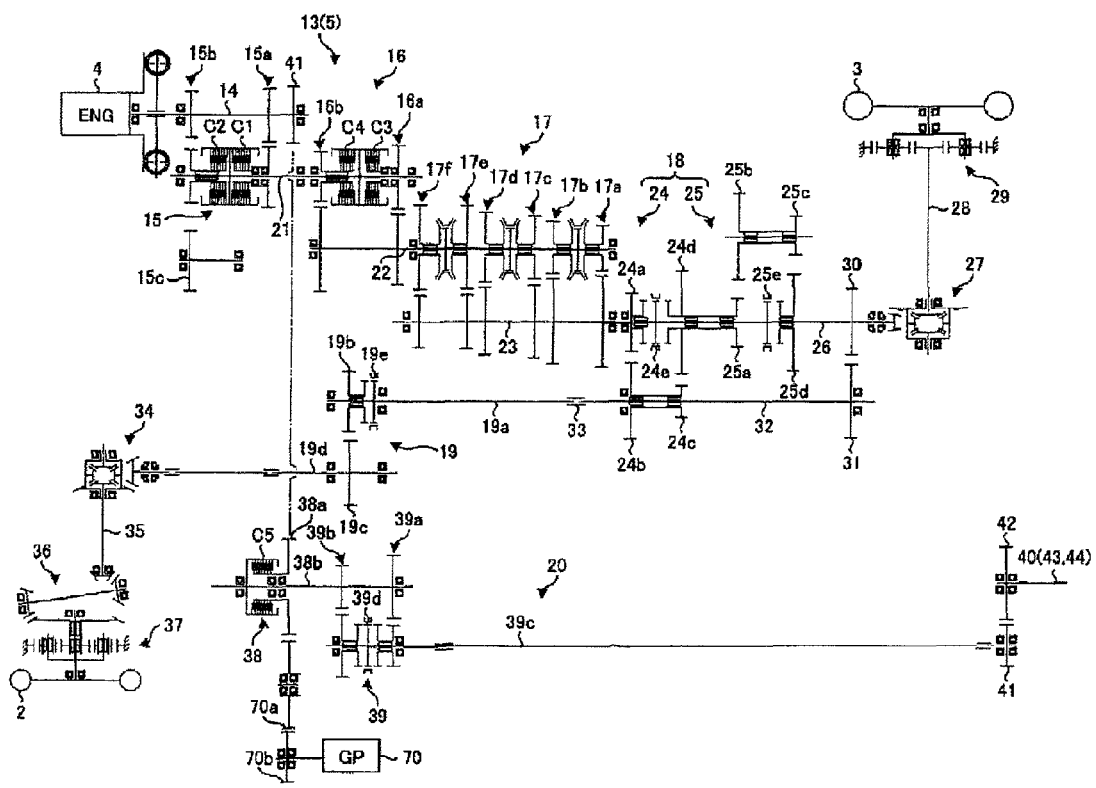
FIG. 5 is a line drawing of a power train of a transmission device of an exemplary work vehicle, consistent with embodiments of the present disclosure.

FIG. 5 is a line drawing of a power train 13 in a transmission case 12 of transmission device 5, consistent with embodiments of the present disclosure. Transmission device 5 can include, among other things, transmission case 12 (see FIG. 1) and power train 13, which can be provided in transmission case 12 and which can transmit rotational power, for example, from engine 4 to back wheels 3 and the like. Power train 13 can transmit the rotational power from engine 4, for example, to front wheels 2, back wheels 3, and the implement mounted to the vehicle body, and can drive these and other elements using the rotational power from engine 4.

Power train 13 can include, among other things, an input shaft 14, a forward/reverse switching mechanism 15, a hi/lo transmission mechanism 16 serving as a high/low transmission mechanism, a primary transmission mechanism 17, a secondary transmission mechanism 18, a 2WD/4WD switching mechanism 19, and a power take-off (PTO) drive mechanism 20. Power train 13 can transmit the rotational power generated by engine 4 to back wheels 3, for example, by way of the following sequence: input shaft 14, forward/reverse switching mechanism 15, hi/lo transmission mechanism 16, primary transmission mechanism 17, and secondary transmission mechanism 18. In addition, power train 13 can transmit the rotational power generated by engine 4 to front wheels 2, for example, by way of the following sequence: input shaft 14, forward/reverse switching mechanism 15, hi/lo transmission mechanism 16, primary transmission mechanism 17, secondary transmission mechanism 18, and 2WD/4WD switching mechanism 19. Furthermore, power train 13 can transmit the rotational power generated by engine 4 to the implement by way of the following sequence: input shaft 14 and PTO drive mechanism 20.

Input shaft 14 can be coupled to the output shaft of engine 4 and the rotational power from engine 4 can be transmitted (be input to) input shaft 14.

Forward/reverse switching mechanism 15 can switch the rotational power transmitted from engine 4 to either a forward rotation or a reverse rotation. Forward/reverse switching mechanism 15 can include, among other things, a forward-side gear stage 15a, a reverse-side gear stage 15b, a reverse rotation gear 15c, a hydraulic multiple-plate clutch (forward clutch) C1, and a hydraulic multiple-plate clutch (reverse clutch) C2. The power transmission path in forward/reverse switching mechanism 15 can be switched by selecting the engagement/release states of hydraulic multiple-plate clutches C1, C2. On the basis of the engagement/release states of hydraulic multiple-plate clutches C1, C2, forward/reverse switching mechanism 15 can change the transmission path when transmitting the rotational power received by input shaft 14 to a counter shaft 21. If hydraulic multiple-plate clutch C1 is in an engaged state and hydraulic multiple-plate clutch C2 is in a released state, forward/reverse switching mechanism 15 can transmit the rotational power received by input shaft 14 to counter shaft 21 as forward rotation, for example, by way of forward-side gear stage 15a and hydraulic multiple-plate clutch C1. If hydraulic multiple-plate clutch C1 is in a released state and hydraulic multiple-plate clutch C2 is in an engaged state, forward/reverse switching mechanism 15 can transmit the rotational power received by input shaft 14 to counter shaft 21 as reverse rotation, for example, by way of reverse-side gear stage 15b, reverse rotation gear 15c, and hydraulic multiple-plate clutch C2. As a result, forward/reverse switching mechanism 15 can switch between the forward and reverse motion of work vehicle 1. Forward/reverse switching mechanism 15 can also function as a main clutch. Releasing both of hydraulic multiple-plate clutches C1 and C2 can result in a neutral state, allowing power transmission to front wheels 2 and back wheels 3 to be shut off. Forward/reverse switching mechanism 15 can switch between forward, reverse, and neutral, using, for example, hydraulic control provided by a forward/reverse selection lever operated by an operator. In addition, hydraulic multiple-plate clutches C1, C2 can both be released by stepping on the clutch pedal.

Hi/lo transmission mechanism 16 can apply a speed change to the rotational power transmitted from engine 4 using either a high-speed stage or a low-speed stage. Hi/lo transmission mechanism 16 can include, among other things, a Hi (high-speed) gear stage 16a, a Lo (low-speed) gear stage 16b, a hydraulic multiple-plate (high-speed) clutch C3, and a hydraulic multiple-plate (low-speed) clutch C4. The power transmission path in hi/lo transmission mechanism 16 can be switched by selecting the engagement/release states of hydraulic multiple-plate clutches C3, C4. The rotational power received by counter shaft 21 can be transmitted to transmission shaft 22 with the transmission path being selected by hi/lo transmission mechanism 16 according to the engagement/release states of hydraulic multiple-plate clutches C3, C4. If hydraulic multiple-plate clutch C3 is in an engaged state and hydraulic multiple-plate clutch C4 is in a released state, the rotational power received by counter shaft 21 can be transmitted by hi/lo transmission mechanism 16 to transmission shaft 22 by way of hydraulic multiple-plate clutch C3 and Hi gear stage 16a. If hydraulic multiple-plate clutch C3 is in a released state and hydraulic multiple-plate clutch C4 is in an engaged state, hi/lo transmission mechanism 16 can change a speed of and transmit the rotational power received by counter shaft 21 to transmission shaft 22 by way of hydraulic multiple-plate clutch C4 and Lo gear stage 16b. As a result, hi/lo transmission mechanism 16 can transmit the rotational power from engine 4 to the next stage using either the transmission gear ratio of Hi gear stage 16a or the transmission gear ratio of Lo (low-speed) gear stage 16b. Hi/lo transmission mechanism 16 can be switched between Hi (high-speed) and Lo (low-speed) using hydraulic control. For example, an operator can switch on or off a hi/lo selection switch (high/low transmission operation switch), so that transmission takes place either at high speed or low speed. Hi/lo transmission mechanism 16 can switch transmission even while work vehicle 1 is running.

Primary transmission mechanism 17 can transmit the rotational power transmitted from engine 4 by way of one of a plurality of transmission stages. Primary transmission mechanism 17 can be a synchromesh transmission mechanism that can transmit the rotational power received from engine 4 using forward/reverse switching mechanism 15 and hi/lo transmission mechanism 16. Primary transmission mechanism 17 can include a plurality of transmission stages, such as a first speed gear stage 17a, a second speed gear stage 17b, a third speed gear stage 17c, a fourth speed gear stage 17d, a fifth speed gear stage 17e, and a sixth speed gear stage 17f. Depending on how speed gear stages 17a-17f are coupled to transmission shaft 22, primary transmission mechanism 17 can transmit the rotational power received by transmission shaft 22 to transmission shaft 23, for example, by way of a speed change applied by one of the speed gear stages 17a-17f. As a result, primary transmission mechanism 17 can transmit the rotational power from engine 4 to the next stage using the transmission gear ratio of any one of the speed gear stages 17a-17f. In primary transmission mechanism 17, one of the plurality of transmission stages can be selected and switched to, for example, by an operator operating a primary transmission operation lever, so that transmission takes place by way of one of speed gear stages 17a-17f. Primary transmission mechanism 17 can switch transmission even while work vehicle 1 is running.

Secondary transmission mechanism 18 can transmit the rotational power from engine 4 received, for example, via forward/reverse switching mechanism 15, hi/lo transmission mechanism 16, and primary transmission mechanism 17. Secondary transmission mechanism 18 can include, among other things, a first secondary transmission 24 and a second secondary transmission 25, and can transmit the rotational power received by transmission shaft 23 to a transmission shaft 26 by way of a speed change through first secondary transmission 24 and second secondary transmission 25. The rotational power received from the engine 4 by way of a speed change by the primary transmission mechanism 17 and the like can be transmitted by first secondary transmission 24 to back wheels 3, i.e., the drive wheels, by way of a speed change at a high-speed stage or a low-speed stage. Second secondary transmission 25 can transmit the rotational power transmitted from engine 4 by way of primary transmission mechanism 17 and the like, for example, by way of a very low speed stage, providing a speed lower than that of first secondary transmission 24, to back wheels 3, i.e., the drive wheels.

First secondary transmission 24 of secondary transmission mechanism 18 can includes, among other things, a first gear 24a, a second gear 24b, a third gear 24c, a fourth gear 24d, and a shifter 24e. First gear 24a can be coupled to transmission shaft 23 to allow integral rotation and can receive the rotational power from transmission shaft 23. Second gear 24b can mesh with first gear 24a. Third gear 24c can be coupled to second gear 24b to allow integral rotation. Fourth gear 24d can mesh with third gear 24c. Shifter 24e can switch the coupling between transmission shaft 26, first gear 24a, and fourth gear 24d. Shifter 24e can be moved to, for example, a Hi (high-speed) position where first gear 24a and transmission shaft 26 are coupled to allow integral rotation, a Lo (low-speed) position where fourth gear 24d and transmission shaft 26 are integrally coupled to allow integral rotation, and a neutral position where transmission shaft 26 is not coupled to either first gear 24a or fourth gear 24d. First secondary transmission 24 can switch the transmission path according to the position of shifter 24e and transmit the rotational power received by transmission shaft 23 to transmission shaft 26. When shifter 24e is at the Hi position, the rotational power received by transmission shaft 23 can be transmitted in first secondary transmission 24 from first gear 24a to transmission shaft 26 without going through second gear 24b, third gear 24c, or fourth gear 24d (that is, power can be transmitted from transmission shaft 23 to first gear 24a to transmission shaft 26). When shifter 24e is at the Lo position, the rotational power received by transmission shaft 23 is slowed down and transmitted in first secondary transmission 24 to transmission shaft 26, for example, by way of the following sequence: first gear 24a, second gear 24b, third gear 24c, fourth gear 24d, and shifter 24e. As a result, first secondary transmission 24 can transmit the rotational power from engine 4 to the next stage using either the Hi (high-speed) transmission gear ratio, which bypasses second gear 24b, third gear 24c, and fourth gear 24d, or the Lo (low-speed) transmission gear ratio that is transmitted by way of a speed change through second gear 24b, third gear 24c, and fourth gear 24d. When shifter 24e is at the neutral position, first secondary transmission 24 can enter a neutral state, that is, first gear 24a and fourth gear 24d can both be disengaged from transmission shaft 26. First secondary transmission 24 can switch between Hi (high-speed), Lo (low-speed), and neutral as a result of the position of shifter 24e being changed, for example, by an operator operating a first secondary transmission operation lever.

Second secondary transmission 25 of secondary transmission mechanism 18 can include, among other things, a first gear 25a, a second gear 25b; a third gear 25c, a fourth gear 25d, and a shifter 25e. First gear 25a can be coupled to fourth gear 24d to allow integral rotation. Second gear 25b can mesh with first gear 25a. Third gear 25c can be coupled to second gear 25b to allow integral rotation. Fourth gear 25d can mesh with third gear 25c. Shifter 25e can select the coupling state between transmission shaft 26 and fourth gear 25d. Shifter 25e can be moved to a very Lo (very low speed) position, where fourth gear 25d and transmission shaft 26 are coupled to allow integral rotation, and a neutral position, where fourth gear 25d and transmission shaft 26 are released (i.e., not coupled). Depending on the position of shifter 25e, second secondary transmission 25 can switch the transmission path so that the rotational power received by transmission shaft 23 can be transmitted to transmission shaft 26. When first secondary transmission 24 is in the neutral state and shifter 25e is in the very low position, second secondary transmission 25 can transmit and reduce the speed of the rotational power received by transmission shaft 23 to transmission shaft 26, for example, by way of the following sequence: first gear 24a of first secondary transmission 24, second gear 24b, third gear 24c, fourth gear 24d, first gear 25a of second secondary transmission 25, second gear 25b, third gear 25c, fourth gear 25d, and shifter 25e. As a result, the rotational power from engine 4 can be transmitted in second secondary transmission 25 to the next stage at the very Lo (very low speed) transmission gear ration, for example, by way of second gear 24b, third gear 24c, fourth gear 24d, first gear 25a, second gear 25b, third gear 25c, and fourth gear 25d. In addition, when shifter 25e is in the neutral position, second secondary transmission 25 can enter a neutral state, that is, fourth gear 25d can be disengaged from transmission shaft 26. Second secondary transmission 25 can be placed in the neutral state when first secondary transmission 24 is set to Hi (high-speed) or Lo (low-speed). Second secondary transmission 25 can switch between very Lo (very low speed) and neutral as a result of the position of shifter 25e being changed, for example, by an operator operating a second secondary transmission operation lever.

As a result, by combining first secondary transmission 24 and second secondary transmission 25, secondary transmission mechanism 18 can transmit the rotational power received by transmission shaft 23 to transmission shaft 26 at either high speed, low speed, or very low speed. More specifically, secondary transmission mechanism 18 can transmit power by way of the Hi (high speed) stage when first secondary transmission 24 is set to Hi (high speed) and second secondary transmission 25 is in the neutral state. Secondary transmission mechanism 18 can transmit power by way of the Lo (low speed) stage when first secondary transmission 24 is set to Lo (low speed) and second secondary transmission 25 is in the neutral state. Secondary transmission mechanism 18 can transmit power by way of the very Lo (very low speed) stage when first secondary transmission 24 is in the neutral state and second secondary transmission 25 is set to very Lo (very low speed). Secondary transmission mechanism 18 can be switched to high speed, low speed, and very low speed when work vehicle 1 is stopped.

Power train 13 of transmission device 5 can transmit the rotational power received by transmission shaft 26 to back wheels 3 by way of a back wheel differential 27, an axle (drive shaft) 28, planetary gear mechanisms 29, and the like. As a result, work vehicle 1 can be propelled with back wheels 3 acting as drive wheels due to the rotational power from engine 4.

As discussed above, the rotation of input shaft 14 can be transmitted to axle 28 as follows: the rotation is first switched to either forward rotation or reverse rotation by forward/reverse switching mechanism 15; hi/lo transmission mechanism 16 transmits the rotation at either high speed or low speed; primary transmission mechanism 17 transmits the rotation by way of one of six stages (i.e., speed gear stages 17a-17f); and secondary transmission mechanism 18 further transmits the rotation at either high speed, low speed, or very low speed. In other words, power train 13 of transmission device 5 can transmits rotation of input shaft 14 to axle 28 by way of a speed change at one of 2×6×3=36 stages.

2WD/4WD switching mechanism 19 can switch between transmitting and not transmitting the rotational power received by transmission shaft 26 to front wheels 2. 2WD/4WD switching mechanism 19 can include, among other things, a transmission shaft 19a, a first gear 19b, a second gear 19c, a transmission shaft 19d, and a shifter 19e. Transmission shaft 19a can receive the rotational power from transmission shaft 26, for example, by way of a gear 30, a gear 31, a transmission shaft 32, a coupling 33, and the like. Transmission shaft 19a can be inserted into first gear 19b, forming an assembly that allows first gear 19b to rotate relative to transmission shaft 19a. Second gear 19c can mesh with first gear 19b. Transmission shaft 19d can be coupled to second gear 19c to allow relative rotation. Shifter 19e can select the coupling state between transmission shaft 19a and first gear 19b. Shifter 19e can be moved, for example, to a 4WD position, where transmission shaft 19a and first gear 19b are coupled to allow integral rotation, and a 2WD position (neutral position), where transmission shaft 19a is not coupled with and released from first gear 19b. When shifter 19e is at the 4WD position, 2WD/4WD switching mechanism 19 can transmit the rotational power received by transmission shaft 19a to transmission shaft 19d by way of first gear 19b and second gear 19c. As a result, 2WD/4WD switching mechanism 19 can transmit the rotational power from engine 4 to front wheels 2. Power train 13 of transmission device 5 can transmit the rotational power received by transmission shaft 19d to front wheels 2, for example, by way of a front wheel differential 34, an axle (drive shaft) 35, a perpendicular shaft 36, a planetary gear mechanism 37, and the like. As a result, work vehicle 1 can run in a four-wheel drive mode by using the rotational power from engine 4 to rotate front wheels 2 and back wheels 3 as drive wheels. When shifter 19e is at the 2WD position, 2WD/4WD switching mechanism 19 can shut off the transmission of the rotational power received by transmission shaft 19a to transmission shaft 19d. As a result, work vehicle 1 can run in a two-wheel drive mode. 2WD/4WD switching mechanism 19 can switch between the two-wheel drive and the four-wheel drive modes when the position of shifter 19e is changed, for example, when an operator operates a 2WD/4WD switching lever.

PTO drive mechanism 20 can provide a configuration wherein the implement is driven by power from engine 4 by the rotational power received from engine 4 being transmitted to a PTO shaft 40 (see FIG. 3) at vehicle body rear 1R (see FIG. 3), the rotational power being then output to the implement. PTO drive mechanism 20 can be formed from a PTO clutch mechanism 38, a PTO transmission mechanism 39, and the like.

PTO clutch mechanism 38 can switch between transmitting and shutting off power to PTO shaft 40. PTO clutch mechanism 38 can include, among other things, a gear 38a, a hydraulic multiple-plate clutch C5, and a transmission shaft 38b. Gear 38a can mesh with a first gear 41 that can be coupled to input shaft 14 to allow integral rotation. Hydraulic multiple-plate clutch C5 can be used to select the transmission state of power between gear 38a and transmission shaft 38b by switching between engaged and released states. When hydraulic multiple-plate clutch C5 is in an engaged state, PTO clutch mechanism 38 can enable a PTO drive state that transmits power to PTO shaft 40, wherein the rotational power received by gear 38a from input shaft 14 by way of a first gear 41 can be transmitted to transmission shaft 38b by way of hydraulic multiple-plate clutch C5. When hydraulic multiple-plate clutch C5 is in a released state, PTO clutch mechanism 38 can enable a PTO non-drive state (neutral state) that shuts off power to PTO shaft 40, wherein transmission to transmission shaft 38b of the rotational power received by gear 38a is shut off. PTO clutch mechanism 38 can be switched between the PTO drive state and the PTO non-drive state by, for example, using hydraulic control resulting from an operator switching on or off a PTO selection switch. In addition, work vehicle 1 can also include a gear pump 70 that can be provided, for example, by way of a gear 70a that meshes with gear 38a, a gear 70b that meshes with gear 70a, and the like. Gear pump 70 can provide hydraulic pressure for the hydraulic system of power train 13 and the like.

When transmitting power to PTO shaft 40, PTO transmission mechanism 39 can provide speed changes. PTO transmission mechanism 39 can include, among other things, a Hi (high-speed) gear stage 39a, a Lo (low-speed) gear stage 39b, a transmission shaft 39c, and a shifter 39d. PTO transmission mechanism 39 can transmit the rotational power received by transmission shaft 38b to transmission shaft 39c while changing speed by way of Hi gear stage 39a or Lo gear stage 39b, depending on the position of shifter 39d. Shifter 39d can switch the coupling state of transmission shaft 39c to Hi gear stage 39a or Lo gear stage 39b. Shifter 39d can be moved, for example, to a Hi (high-speed) position where Hi gear stage 39a and transmission shaft 39c are coupled, a Lo (low-speed) position where Lo gear stage 39b and transmission shaft 39c are coupled, and a neutral position where transmission shaft 39c is not coupled to and released from either Hi gear stage 39a or Lo gear stage 39b. When shifter 39d is at the Hi position, PTO transmission mechanism 39 can transmit the rotational power received by transmission shaft 38b to transmission shaft 39c by way of Hi gear stage 39a. When shifter 39d is at the Lo position, PTO transmission mechanism 39 can transmit the rotational power received by transmission shaft 38b to transmission shaft 39c by way of Lo gear stage 39b. As a result, PTO transmission mechanism 39 can transmit the rotational power from engine 4 to the next stage by way of a speed change using the transmission gear ratio of Hi gear stage 39a or the transmission gear ratio of Lo gear stage 39b. When shifter 39d is at the neutral position, PTO transmission mechanism 39 can enter a neutral state, that is, Hi gear stage 39a and Lo gear stage 39b can both be disengaged from transmission shaft 39c. PTO transmission mechanism 39 can switch between high speed, low speed, and neutral as a result of the position of shifter 39d being changed, for example, by an operator operating a PTO transmission operation lever 47.

The implement can be coupled to PTO shaft 40 so that the rotational power of engine 4 is transmitted to the implement. More specifically, an input shaft (not shown in the figures) of the implement can be driven by way of a universal joint shaft (not shown in the figures) equipped with a power receiving side spline cavity that fits against a spline groove of PTO shaft 40. The rotational power received by transmission shaft 39c can be transmitted by way of first gear 41, a second gear 42, and the like to drive PTO shaft 40.

As described above, the rotation of input shaft 14 can be transmitted to PTO transmission mechanism 39 by way of PTO clutch mechanism 38; the speed can be changed in PTO transmission mechanism 39 by either the high-speed or the low-speed stage, and the resulting output can be transmitted to PTO shaft 40 to drive PTO shaft 40. As a result, in work vehicle 1, the rotational power transmitted from engine 4 can undergo a speed change and can be output from PTO shaft 40 to the implement to drive the implement.

Figure 6:
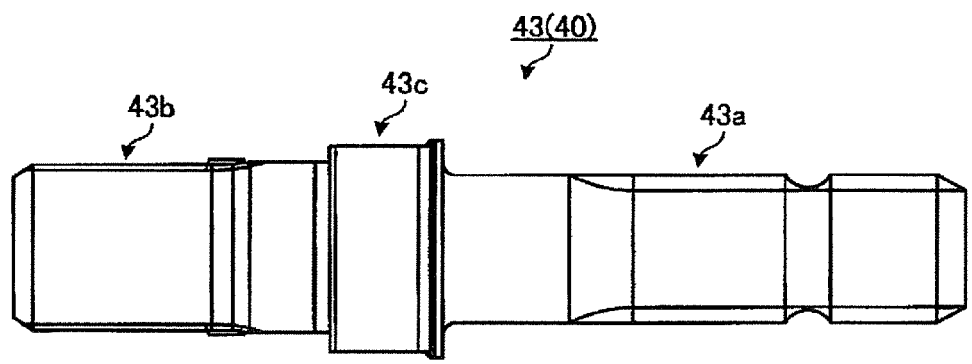
FIG. 6 is a drawing of a first PTO shaft of an exemplary work vehicle, consistent with embodiments of the present disclosure.
Figure 7:
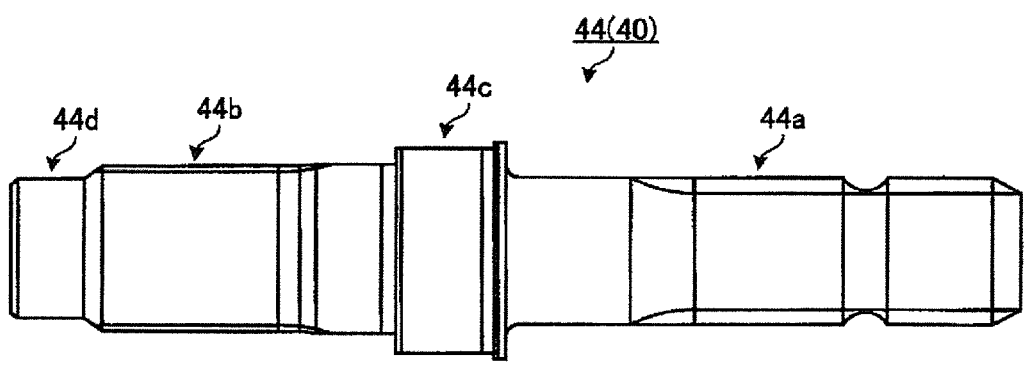
FIG. 7 is a drawing of a second PTO shaft of an exemplary work vehicle, consistent with embodiments of the present disclosure.
Figure 8:
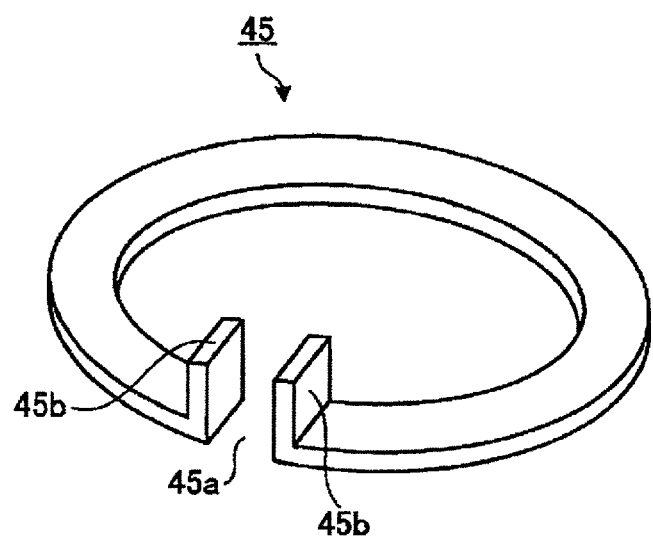
FIG. 8 is a perspective drawing of a removable ring of an exemplary work vehicle, consistent with embodiments of the present disclosure.
Figure 9:
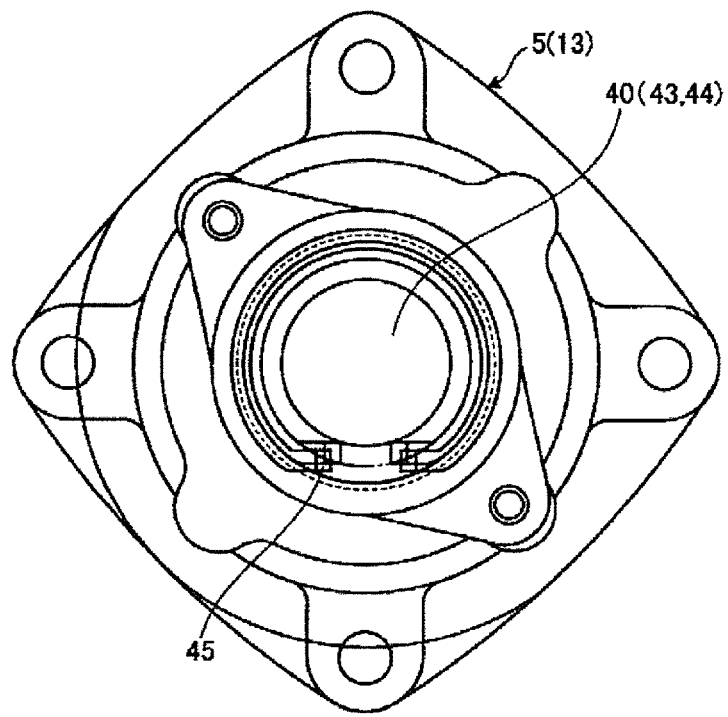
FIG. 9 is a drawing of a removable ring in of an exemplary work vehicle, consistent with embodiments of the present disclosure.

In some embodiments, PTO shaft 40 of PTO drive mechanism 20 can be removable and it would be possible, for example, to switch between at least two types of PTO shafts 40 in accordance with the type of the implement being used or the like. A first PTO shaft 43 shown in FIG. 6 and a second PTO shaft 44 shown in FIG. 7 are examples of the two types of PTO shafts 40 that can be used in these embodiments. In other words, work vehicle 1 can use at least first PTO shaft 43 and second PTO shaft 44 as PTO shaft 40.

First PTO shaft 43 can, for example, be coupled with an implement by way of straight-sided splines (6 spline) 43a as defined by the International Organization for Standardization (ISO). Second PTO shaft 44 can, for example, be coupled with an implement by way of involute splines (21 spline) 44a as defined by the ISO. As described above, first PTO shaft 43 and second PTO shaft 44 can be attached to the main unit of power train 13 of transmission device 5 in vehicle body rear 1R (see FIG. 3). First PTO shaft 43 and second PTO shaft 44 can be attached so that attachment ends 43b, 44b opposite from the hexagonal splines 43a and involute splines 44a can be rotated relative to the main unit of power train 13 by way of splines or the like. For example, a spline cavity 42c can be formed on an inner perimeter of a boss 42a that can be fitted to second gear 42 to form a spline fit with attachment ends 43b, 44b (see FIG. 6 and FIG. 7), resulting in a configuration that allows the shaft to be attached to and removed from boss 42a from behind and allows power to be transmitted. In addition, first PTO shaft 43 and second PTO shaft 44 can both include large-diameter sections 43c, 44c at middle sections thereof.

First PTO shaft 43 and second PTO shaft 44 can have substantially similar outer shapes, but second PTO shaft 44 can be formed with a projection 44d at attachment end 44b and extend further than first PTO shaft 43 in the axial direction by an amount equal to the length of projection 44d. With regard to the high-speed setting and the low-speed stage of PTO transmission mechanism 39, first PTO shaft 43 can be used for both rotating at a relatively higher speed and for rotating at a relatively lower speed. In contrast, while second PTO shaft 44 can be used for rotating at the relatively higher speed, it may not used when rotating at the relatively lower speed (i.e., when transmitting a relatively high torque), due to factors such as the strength at the position of engagement with the spline cavity of the power-receiving section on the implement side. The description below will refer to "PTO shaft 40" where there is no particular need to distinguish between first PTO shaft 43 and second PTO shaft 44.

Figure 10:
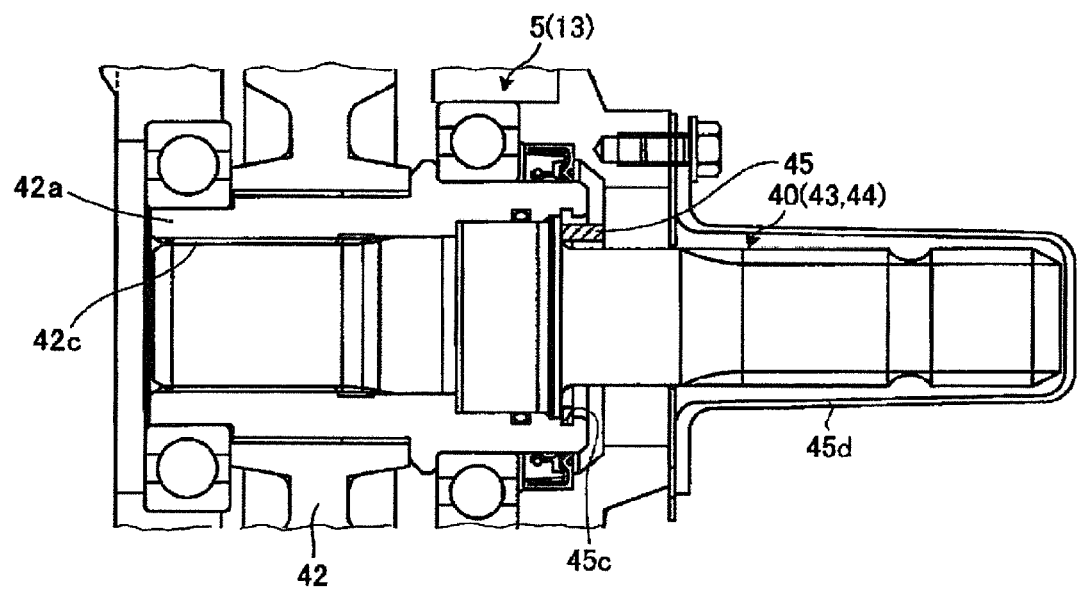
FIG. 10 is a partial cross-section drawing of a removable ring and a PTO shaft of an exemplary work vehicle, consistent with embodiments of the present disclosure.
Figure 11:
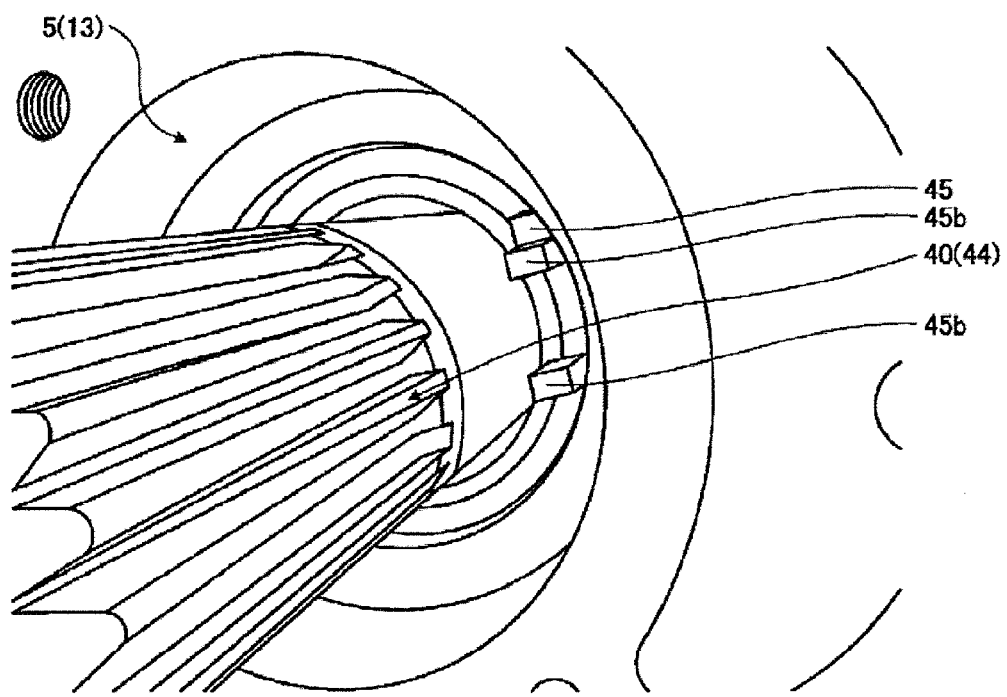
FIG. 11 is a partial perspective drawing of a removable ring and a PTO shaft of an exemplary work vehicle, consistent with embodiments of the present disclosure.

PTO shaft 40 can be removably attached to vehicle body rear 1R side of the main unit of power train 13 of transmission device 5 by way of a removable ring 45, an example of which is shown in FIG. 8, FIG. 9, FIG. 10, and FIG. 11. Removable ring 45 can be formed as a ring with a cut-out 45a. Grasping projections 45b are provided at the edges of cut-out 45a. Removable ring 45 can be fitted to a fitting groove section 45c so that PTO shaft 40 is prevented from slipping out from the main unit of power train 13 when it is rotatably inserted into the main unit of power train 13. In addition, by grasping projections 45b to flex removable ring 45, an operator can remove removable ring 45 from fitting groove section 45c, thereby easily removing PTO shaft 40 from the main unit of power train 13. As a result, operability and efficiency of operation can be improved for work vehicle 1, since an operator can easily replace PTO shaft 40. FIG. 10 shows a PTO shaft cover 45d that can protect PTO shaft 40 when PTO shaft 40 is not in use.

Figure 3:
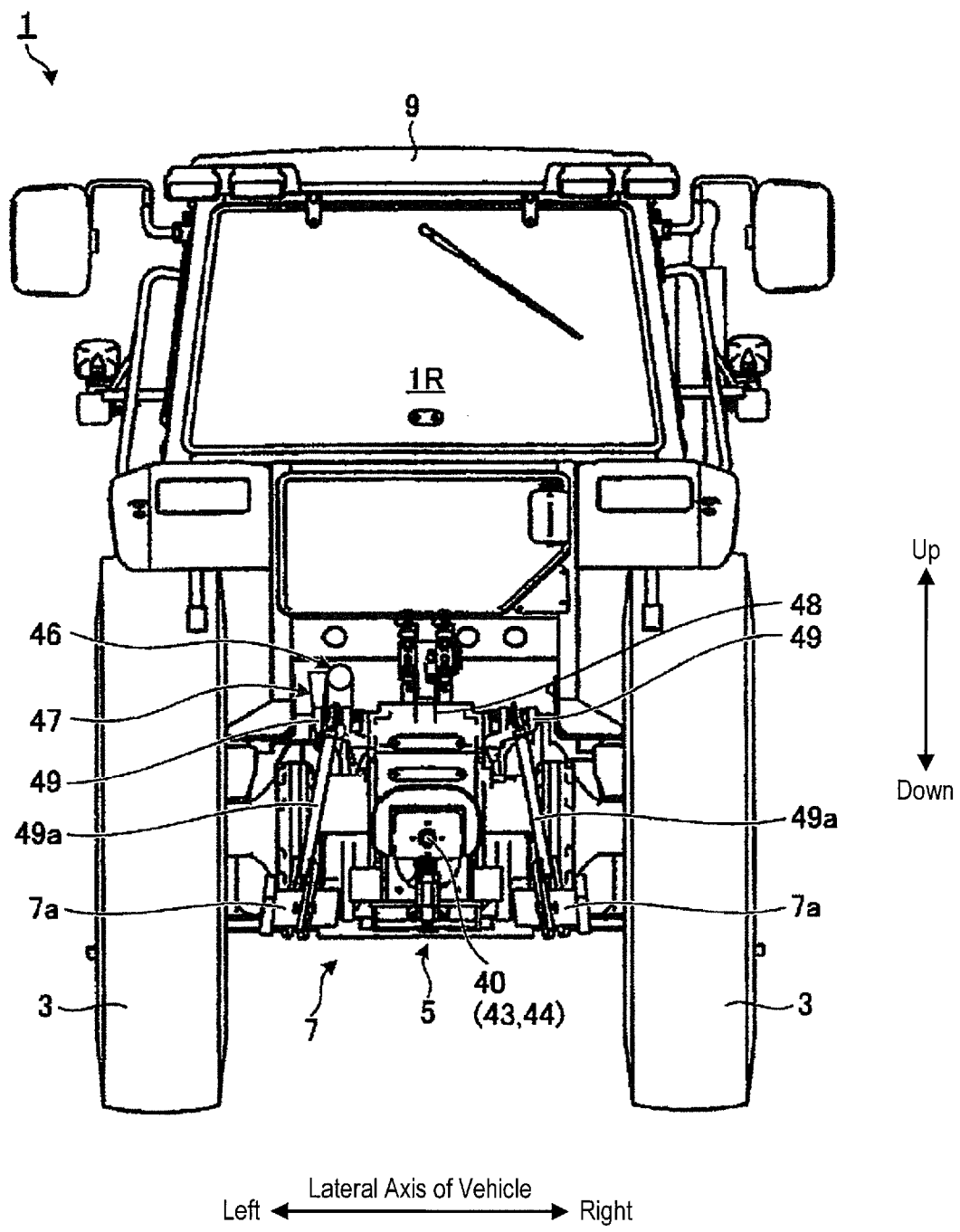
FIG. 3 is a drawing of the exemplary work vehicle of FIG. 1, as seen from the rear of the vehicle body (i.e., from arrow B)
Figure 4:
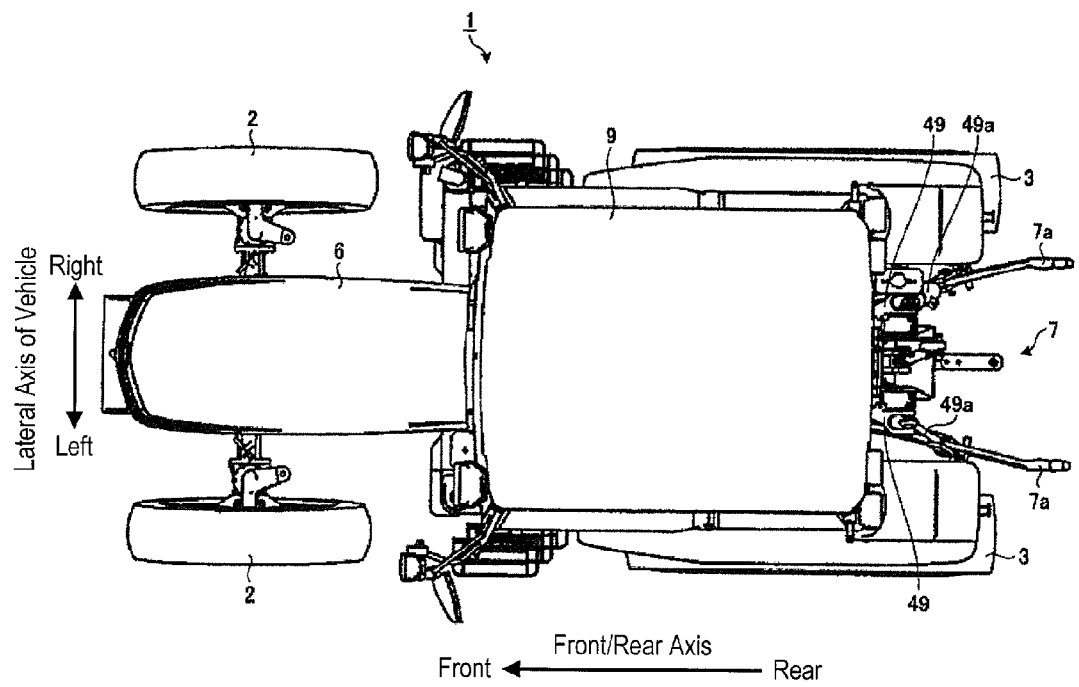
FIG. 4 is a drawing of the exemplary work vehicle of FIG. 1, as seen from above of the vehicle body (i.e., from arrow B)

As shown in FIG. 3, vehicle body rear 1R of work vehicle 1 can include, among other things, a storage unit 46 that, when one of the two types of PTO shafts 40 is mounted on vehicle body rear 1R as described above and is being used to drive the implement, can hold the remaining PTO shaft 40 that has been removed from vehicle body rear 1R; and PTO transmission operation lever 47 that can be used for operating the transmission of PTO drive mechanism 20.

Figure 12:
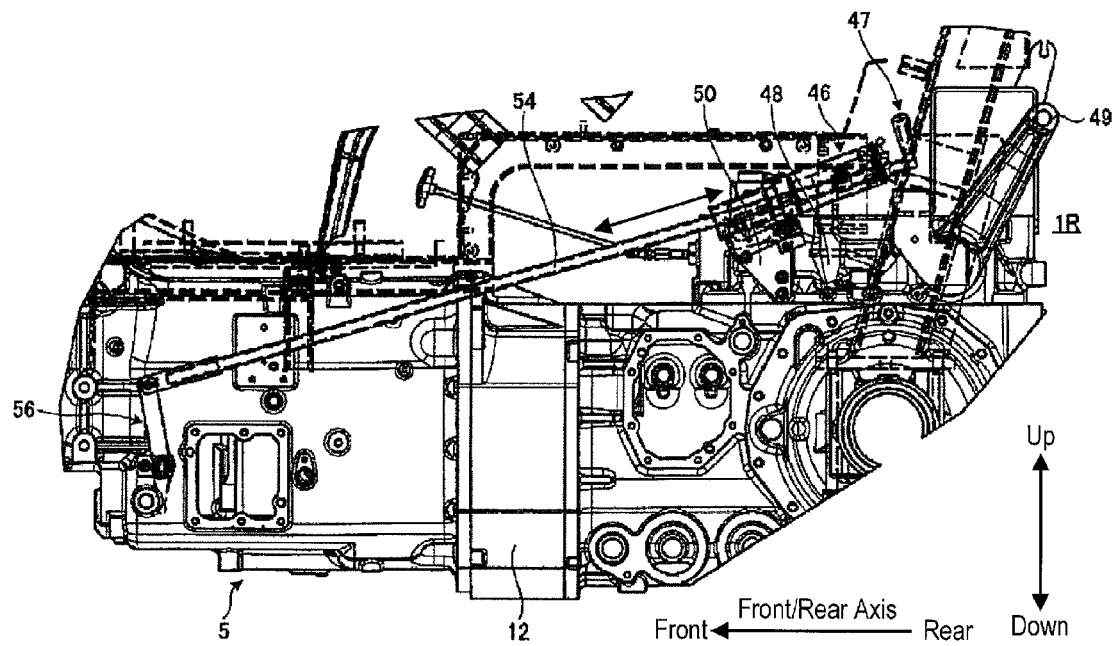
FIG. 12 is a partial side-view drawing of a transmission case of an exemplary work vehicle, as seen from the left side of the lateral axis of the work vehicle, consistent with embodiments of the present disclosure.
Figure 13:
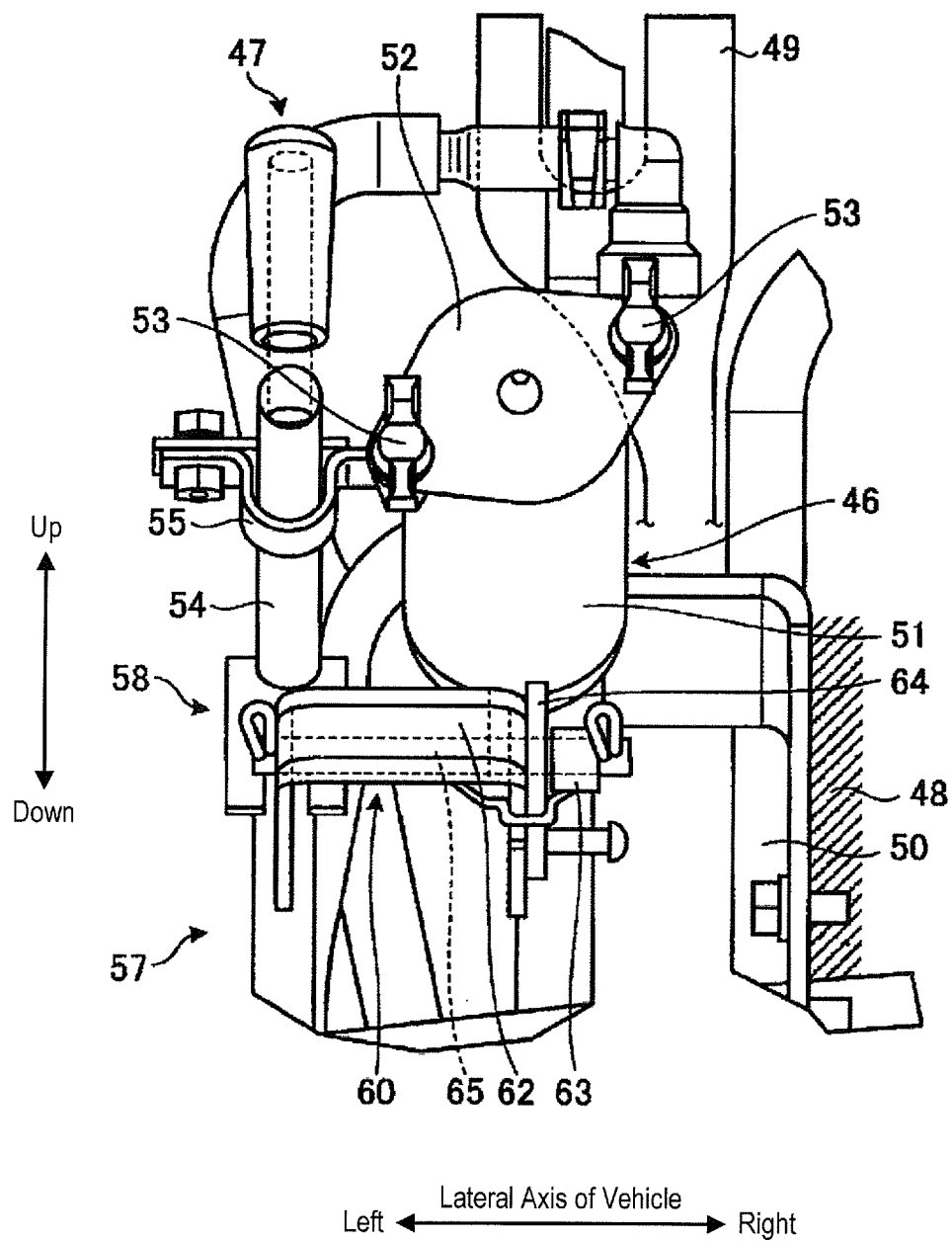
FIG. 13 is a drawing of a PTO transmission operation lever and a storage unit of an exemplary work vehicle, as seen from the rear of the work vehicle, consistent with embodiments of the present disclosure.

More specifically, storage unit 46 can hold PTO shaft 40 and can be supported in vehicle body rear 1R by a cylinder case 48 that can serve as a securing unit, as shown in FIG. 12 and FIG. 13. Cylinder case 48 can be secured above (with reference to the vertical axis) transmission case 12 of transmission device 5 and can be provided with the pair of pivotable lift arms 49 to the left and right (with reference to the lateral axis of the vehicle) (see also FIG. 3 and FIG. 4). Lift arms 49 can pivot upward when hydraulic fluid is supplied to a hydraulic cylinder provided inside cylinder case 48 and, conversely, pivot downward when the hydraulic fluid is discharged. Cylinder case 48 configured in this manner can secure and support storage unit 46 by way of a bracket 50 or the like provided on the surface to the left (with reference to the lateral axis of the vehicle).

As shown in FIG. 14, FIG. 15, FIG. 16, FIG. 17, and FIG. 18, storage unit 46 can include a cylindrical case 51 and a cover 52. Cylindrical case 51 can be formed as a hollow cylinder with an inner diameter that can be large enough to hold first PTO shaft 43 or second PTO shaft 44. Cylindrical case 51 can be supported by cylinder case 48 so that the central axis of the cylindrical shape is sloped with reference to the horizontal axis (see FIG. 12). Cylindrical case 51 can be sloped so that the end toward the front (with reference to the front/rear axis) is positioned downward (with reference to the vertical axis) and the end toward the rear (with reference to the front/rear axis) is positioned upward (with reference to the vertical axis). The end toward the front (with reference to the front/rear axis) of cylindrical case 51 can be closed while the end toward the rear (with reference to the front/rear axis) can be open. Cover 52 of storage unit 46 can be tightly secured to the rear end (with reference to the front/rear axis) of cylindrical case 51 using wing nuts 53 or the like. When storing first PTO shaft 43 or second PTO shaft 44, wing nuts 53 can be removed to remove cover 52, and first PTO shaft 43 or second PTO shaft 44 can be inserted into storage unit 46 by way of the opening at the end toward the rear (with reference to the front/rear axis).

In vehicle body rear 1R, PTO transmission operation lever 47 can be used to operate transmission of PTO drive mechanism 20 and, as shown in FIG. 12 and FIG. 13, can be supported by cylinder case 48 by way of storage unit 46 in a manner that allows motion along a direction for operating the transmission. The direction for operating the transmission of PTO transmission operation lever 47 refers, for example, to a direction that is sloped with reference to the horizontal axis and extends along the center axis of cylindrical case 51. In other words, the direction for operating the transmission of PTO transmission operation lever 47 can be a direction that, going from the rear side to the front side along the front/rear axis, extends downward with reference to the horizontal axis. PTO transmission operation lever 47 can be provided with a rod unit 54 that extends from the front to the rear (with reference to the front/rear axis) along the direction for operating the transmission. Rod unit 54 can be provided to the left (with reference to the lateral axis of the vehicle) of cylinder case 48 and, more specifically, to the left (with reference to the lateral axis of the vehicle) of storage unit 46. The main unit of the PTO transmission operation lever 47 can be provided at the end toward the rear (with reference to the front/rear axis). Rod unit 54 of the PTO transmission operation lever 47 can be slidably supported by a slide guide unit 55 provided on cylindrical case 51 to allow PTO transmission operation lever 47 to slide along the direction for operating the transmission. As a result, together with rod unit 54, PTO transmission operation lever 47 can be supported, for example, by cylinder case 48 by way of bracket 50, cylindrical case 51 of storage unit 46, slide guide unit 55, and the like, in a manner that allows movement along the direction for operating the transmission when the transmission is operated. PTO transmission means 150 supported by storage unit 46 can be formed from PTO transmission operation lever 47 and rod unit 54.

Figure 14:
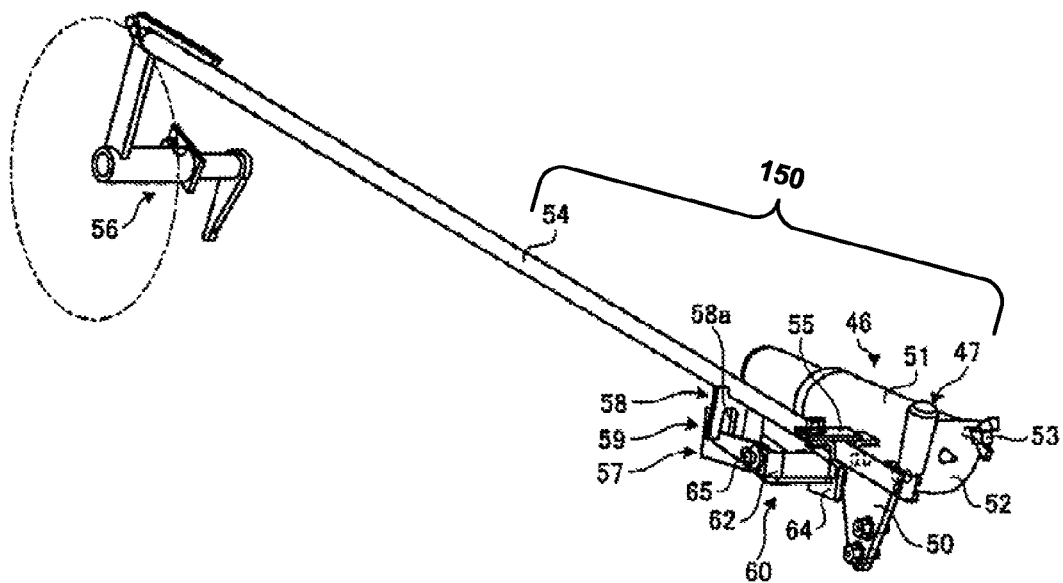
FIG. 14 is a perspective drawing of a PTO transmission operation lever and a storage unit of an exemplary work vehicle, consistent with embodiments of the present disclosure.
Figure 15:
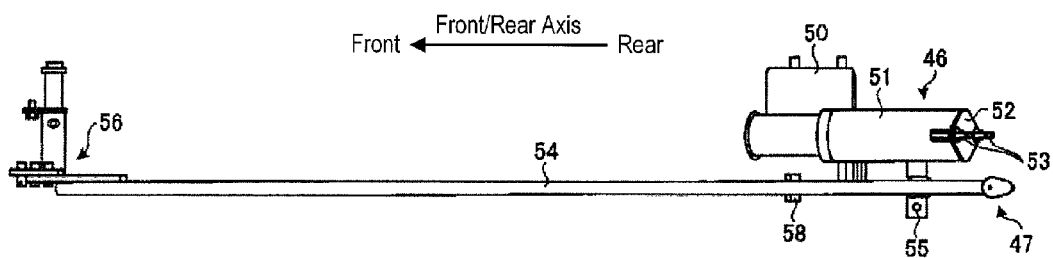
FIG. 15 is a drawing of a PTO transmission operation lever and a storage unit of an exemplary work vehicle, as seen from above, consistent with embodiments of the present disclosure.

In PTO transmission operation lever 47, a shifter arm 56 can be provided at the end of rod unit 54 opposite from the end provided with the main unit of PTO transmission operation lever 47, as shown, for example, in FIG. 12, FIG. 14, and FIG. 15. When a transmission operation is performed on PTO transmission operation lever 47, shifter arm 56 can move shifter 39d (see FIG. 5) of PTO transmission mechanism 39 (see FIG. 5). When PTO transmission operation lever 47 is moved together with rod unit 54 in the direction for operating the transmission, shifter arm 56 can pivot, allowing shifter 39d to move to either the Hi (high-speed) position, the Lo (low-speed) position, or the neutral position.

Figure 17:
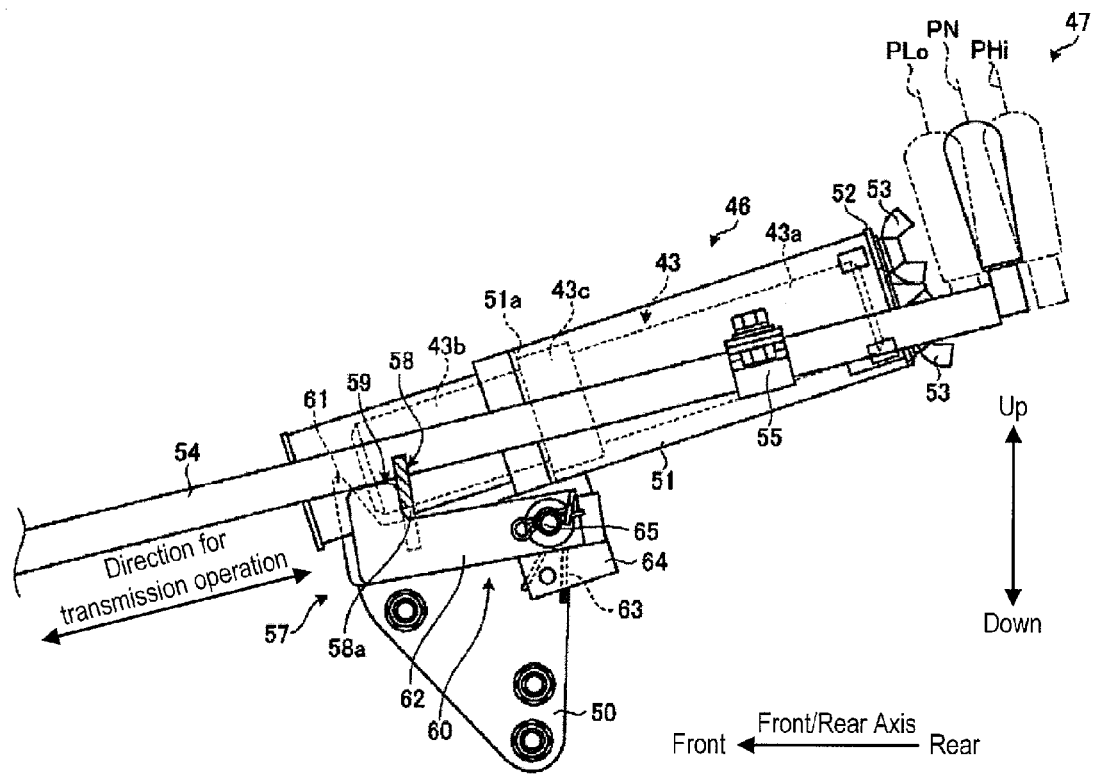
FIG. 17 is a drawing of a section of a PTO transmission operation lever and a storage unit of an exemplary work vehicle, as seen from the left side of the lateral axis of the work vehicle, consistent with embodiments of the present disclosure.
Figure 18:
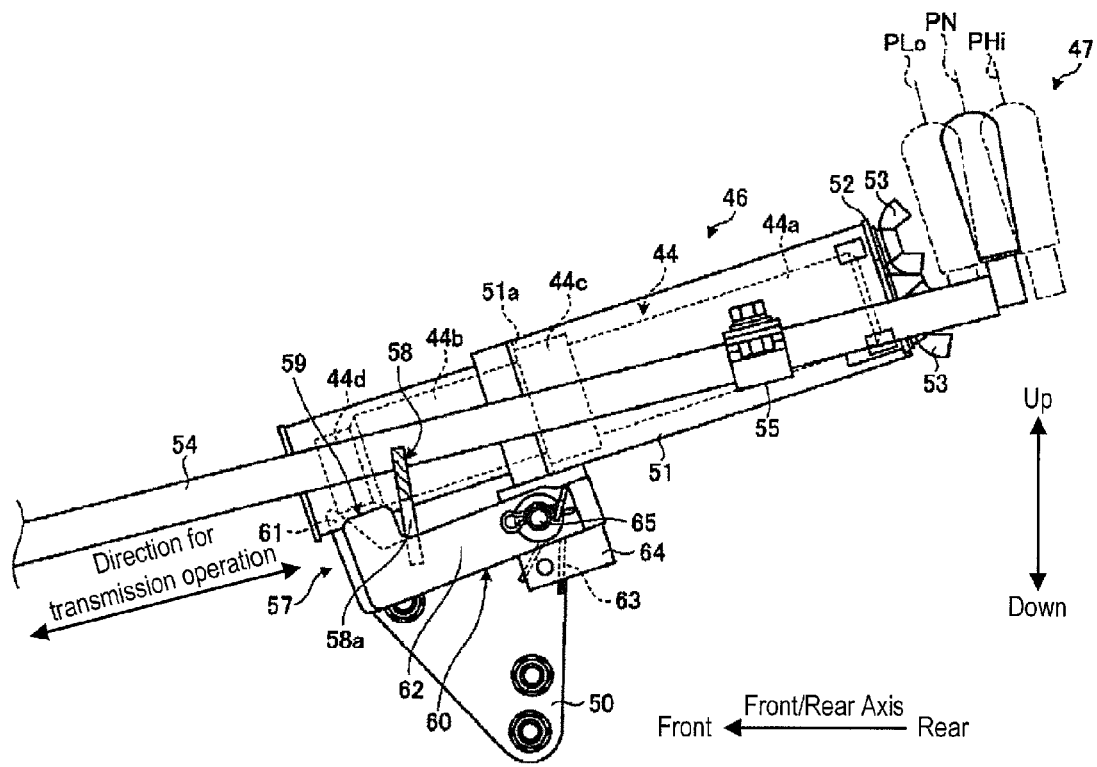
FIG. 18 is a drawing of a section of a PTO transmission operation lever and a storage unit of an exemplary work vehicle, as seen from the left side of the lateral axis of the work vehicle, consistent with embodiments of the present disclosure.

When a transmission operation is performed, PTO transmission operation lever 47 can move in tandem with rod unit 54 to a neutral position PN, a low-speed position PLo, or a high-speed position PHi, as shown, for example, in FIG. 17 and FIG. 18. The neutral position PN of PTO transmission operation lever 47 can be a position where shifter 39d (see FIG. 5) is moved to the neutral position and PTO transmission mechanism 39 (see FIG. 5) is put into a neutral state. The low-speed position PLo of PTO transmission operation lever 47 can be a position where shifter 39d is moved to the Lo position and PTO transmission mechanism 39 is put into a low-speed state, resulting in PTO shaft 40 being rotated at a relatively low speed. The low-speed position PHi of PTO transmission operation lever 47 can be a position where shifter 39d is moved to the Hi position and PTO transmission mechanism 39 is put into a high-speed state, resulting in PTO shaft 40 being rotated at a relatively high speed. Using the neutral position PN as the reference, pushing PTO transmission operation lever 47 forward (with reference to the front/rear axis) along the direction for operating the transmission can move PTO transmission operation lever 47 to the low-speed position PLo. Using the neutral position PN as the reference, pulling PTO transmission operation lever 47 rearward (with reference to the front/rear axis) along the direction for operating the transmission can move PTO transmission operation lever 47 to the high-speed position PHi. As a result, the operator can select the position of shifter 39d by performing transmission operations on PTO transmission operation lever 47 along the direction for operating the transmission, thereby setting the transmission state of PTO transmission mechanism 39 (i.e., the rotational drive state of PTO shaft 40) to high speed, low speed, or neutral.

As shown in FIG. 13, FIG. 14, FIG. 16, FIG. 17, and FIG. 18, work vehicle 1 can be further equipped with a transmission range varying mechanism 57. When one of the two types of PTO shafts 40 is being used, transmission range varying mechanism 57 can determine a transmission range for PTO transmission mechanism 39 of PTO drive mechanism 20 based on the remaining PTO shaft 40 stored in storage unit 46. In other words, the storing of the remaining PTO shaft 40 (i.e., the unused PTO shaft 40) in storage unit 46, can allow transmission range varying mechanism 57 to determine a transmission range for PTO transmission mechanism 39 that is suited for the PTO shaft 40 being used. The transmission range can limit the transmission to a range from the neutral position to a predetermined transmission position.

Transmission range varying mechanism 57 can include, among other things, a stopper plate 58 serving as a fixed abutment unit, a movable stopper unit 59 serving as a movable abutment unit, and a cam mechanism 60.

Stopper plate 58 can be provided on rod unit 54 of PTO transmission operation lever 47. Stopper plate 58 can be formed as a plate that can be secured to intersect with rod unit 54 in the direction for operating the transmission. Stopper plate 58 can extend downward (with reference to the vertical axis) from rod unit 54 and can be formed with a cut-out 58a at the bottom edge (with reference to the vertical axis).

Movable stopper unit 59 can pivot between an abutment position that allows abutment against stopper plate 58 (see FIG. 17) and a non-abutment position where movable stopper unit 59 is retreated from this abutment position (see FIG. 18).

Cam mechanism 60 can bias movable stopper unit 59 toward the abutment position and pivot movable stopper unit 59 from the abutment position to the non-abutment position when a movable projection unit 61 that is projected into storage unit 46 comes into contact with an end of one of the two types of PTO shafts 40 stored in storage unit 46. Cam mechanism 60 can include a cam member 62 and a torque spring 63. Cam member 62 can be formed as a substantially "C"-shaped arm. Movable stopper unit 59 can be formed integrally with one end of the "C" shape, and movable projection unit 61 can be formed integrally with the other end of the "C" shape. Cam member 62 can be attached by way of a pivot shaft 65 to an attachment member 64 secured to cylindrical case 51. Movable projection unit 61 of cam member 62 and movable stopper unit 59 can be positioned facing each other along the lateral axis of the vehicle. Movable stopper unit 59 can be positioned to the left side (with reference to the lateral axis of the vehicle), while movable projection unit 61 can be positioned to the right side (with reference to the lateral axis of the vehicle) (see FIG. 16). Pivot shaft 65 can be oriented along the lateral axis of the vehicle. Cam member 62 can be supported by attachment member 64 and can pivot around pivot shaft 65. Using attachment member 64 and the like as a reaction-receiving member, torque spring 63 can bias cam member 62 so that movable stopper unit 59 is positioned toward the abutment position. In this configuration, cam member 62 can be biased upward (with reference to the vertical axis) by torque spring 63. Movable stopper unit 59 can be abutted against stopper plate 58 at the abutment position shown in FIG. 17. In addition, cylindrical case 51 of storage unit 46 can be formed with a cam opening 66 (see FIG. 16) positioned at the bottom (with reference to the vertical axis) of the front end (with reference to the front/rear axis). When movable stopper unit 59 is at the abutment position (see FIG. 17), movable projection unit 61 of cam member 62 can be positioned to be projected through cam opening 66 into cylindrical case 51 of storage unit 46.

As a result, with transmission range varying mechanism 57 configured in this manner, movable stopper unit 59 can, depending on the type of PTO shaft 40 being stored in storage unit 46, be positioned at the abutment position so that the abutment of movable stopper unit 59 against stopper plate 58 restricts the movement of rod unit 54. This allows transmission range varying mechanism 57 to restrict the transmission operations performed by PTO transmission operation lever 47, thus restricting the transmission range of PTO drive mechanism 20.

As described above, the axial lengths of first PTO shaft 43 and second PTO shaft 44 in this example differ by the length of projection 44d (see FIG. 18), resulting in different end positions when stored in storage unit 46. Accordingly, transmission range varying mechanism 57 can take advantage of this difference in length to restrict the transmission operations performed by PTO transmission operation lever 47 and restrict the transmission range of PTO drive mechanism 20.

As an example, if second PTO shaft 44 is being used in work vehicle 1, first PTO shaft 43 is stored in storage unit 46, as shown in FIG. 17. When first PTO shaft 43 is stored in cylindrical case 51 of storage unit 46, the position of large-diameter section 43c can be determined by its abutment with a small-diameter section 51a in cylindrical case 51. Thus, in this exemplary transmission range varying mechanism 57, the end of first PTO shaft 43 does not come into contact with movable projection unit 61. As a result, with this exemplary transmission range varying mechanism 57, movable stopper unit 59 biased by torque spring 63 remains at the abutment position. Thus, with this exemplary transmission range varying mechanism 57, the abutment of movable stopper unit 59 against stopper plate 58 prevents movement of rod unit 54 toward the low-speed position PLo and prevents switching the transmission to the low-speed position PLo using PTO transmission operation lever 47. As a result, with this exemplary transmission range varying mechanism 57, transmission operations using PTO transmission operation lever 47 can be restricted and the transmission range of PTO drive mechanism 20 can be restricted. In other words, during use of second PTO shaft 44, which can be used for relatively high-speed rotations and not for relatively low-speed rotations, transmission range varying mechanism 57 can allow the transmission state of PTO transmission mechanism 39 (i.e., the rotation drive state of PTO shaft 40) to be switched to high speed while preventing a switch to low speed.

If, on the other hand, first PTO shaft 43 is being used on work vehicle 1, second PTO shaft 44 can be stored in the storage unit 46, as shown in FIG. 18. With this exemplary transmission range varying mechanism 57, if second PTO shaft 44 is stored in cylindrical case 51 of storage unit 46, the end of second PTO shaft 44 comes into contact with movable projection unit 61, since second PTO shaft 44 is longer than first PTO shaft 43 by the length of projection 44d. As a result, with this exemplary transmission range varying mechanism 57, second PTO shaft 44 overcomes the bias from torque spring 63 and pushes movable projection unit 61 down, causing movable stopper unit 59 to pivot from the abutment position to the non-abutment position. With this exemplary transmission range varying mechanism 57, when rod unit 54 moves toward the low-speed position PLo, movable stopper unit 59 passes through cut-out 58a of stopper plate 58, allowing rod unit 54 to move to the low-speed position PLo and allowing PTO transmission operation lever 47 to switch the transmission to the low-speed position PLo and the high-speed position PHi. As a result, transmission range varying mechanism 57 does not restrict transmission operations performed using PTO transmission operation lever 47 and increases the transmission range of PTO drive mechanism 20. In other words, during use of first PTO shaft 43, which can be used for both relatively high-speed rotations and relatively low-speed rotations, transmission range varying mechanism 57 can allow the transmission state of PTO transmission mechanism 39 (i.e., the rotation drive state of PTO shaft 40) to be switched to high speed or low speed.

In work vehicle 1 described above, storage unit 46 is provided in vehicle body rear 1R so that when switching the PTO shaft 40 being used, the PTO shaft 40 that is not being used can be immediately stored in storage unit 46 once it is removed from the vehicle body. This prevents the PTO shaft 40 that is not being used from being misplaced. Furthermore, in work vehicle 1, the PTO transmission operation lever 47 is also provided in vehicle body rear 1R. Thus, after switching the PTO shaft 40 to be used, an operator can immediately perform a transmission operation to change the speed of the rotation of PTO shaft 40 without needing to return to driver's seat 8 and sit down. As a result, work vehicle 1 provides improved operability and efficiency.

In addition, in work vehicle 1, PTO transmission operation lever 47 can be supported by cylinder case 48 by way of storage unit 46 in a manner that allows motion in the direction for operating the transmission. Thus, in some embodiments, there is no need to provide a support member or the like separate from storage unit 46 to support PTO transmission operation lever 47. This allows the number of parts used to form work vehicle 1 to be reduced, thereby lowering production costs.

Furthermore, when one of the two types of PTO shafts 40 is being used, transmission range varying mechanism 57 of work vehicle 1 can set a transmission range for PTO drive mechanism 20 based of the unused PTO shaft 40 that is being stored in storage unit 46. As a result, in work vehicle 1, the transmission range available for the PTO shaft 40 being used can be set up by storing the PTO shaft 40 that is not being used in storage unit 46.

Depending on the type of PTO shaft 40 being stored in storage unit 46 of work vehicle 1, movable stopper unit 59 can be positioned at the abutment position so that movable stopper unit 59 is abutted against stopper plate 58. This causes transmission range varying mechanism 57 to restrict transmission operations performed with PTO transmission operation lever 47 and limits the transmission range of PTO drive mechanism 20. In this case, transmission range varying mechanism 57 allows the rotational drive state of PTO shaft 40 to be set to either the high-speed setting or the low-speed setting when first PTO shaft 43 is being used, and allows the rotational drive state of PTO shaft 40 to be set to the high-speed setting but not to the low-speed setting when second PTO shaft 44 is being used. As a result, work vehicle 1 can, based on the PTO shaft 40 that is not being used, set the transmission range to one that is appropriate for the type of PTO shaft 40 that is being used. Thus, for example, the use of a wrong transmission range can be prevented, which improves the operability of work vehicle 1.

Figure 16:
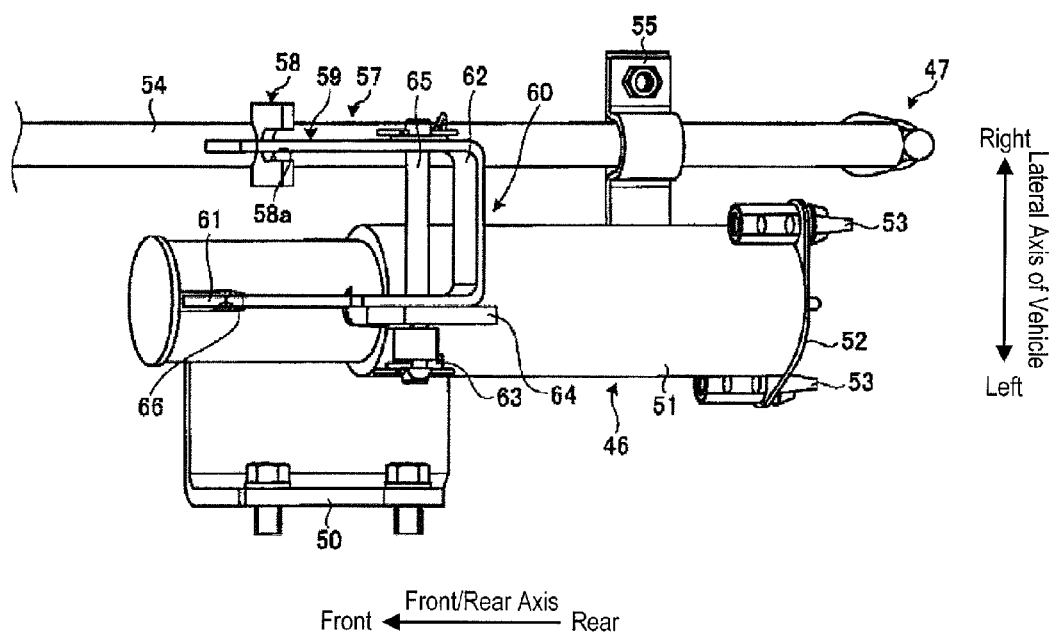
FIG. 16 is a drawing of a section of a PTO transmission operation lever and a storage unit of an exemplary work vehicle, as seen from below, consistent with embodiments of the present disclosure.

Cylindrical case 51 of storage unit 46 can be sloped with reference to the horizontal axis, and the lower end (with reference to the vertical axis) can be formed with cam opening 66 (see FIG. 16). Thus, cam opening 66 can function as a drainage hole. As a result, if water enters cylindrical case 51, the water can be drained out from cylindrical case 51 by way of cam opening 66. This allows the inside of cylindrical case 51 to be kept in a suitable state without requiring a drainage hole separate from cam opening 66.

Accordingly, as described above, work vehicle 1 can be equipped, among other things, with: PTO drive mechanism 20 that applies a speed change to the rotational power received from engine 4 and outputs the result to an implement from PTO shaft 40 at vehicle body rear 1R, that allows the attachment and removal of PTO shaft 40, and that can be used with at least two types of PTO shafts 40; storage unit 46 that, when one of the two types of PTO shafts 40 is being used, can store the remaining shaft; and PTO transmission operation lever 47 that can be used to perform transmission operations for PTO drive mechanism 20; wherein storage unit 46 and PTO transmission operation lever 47 are provided in vehicle body rear 1R.

Figure 19:
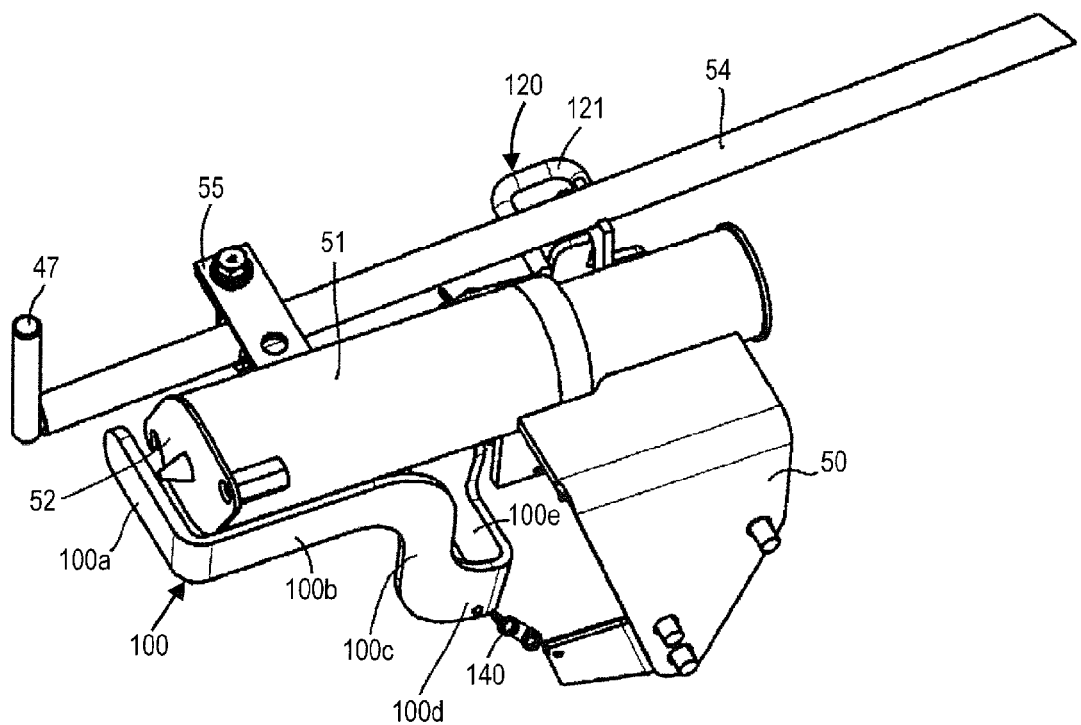
FIG. 19 is a perspective drawing of a section of a PTO transmission operation lever and a storage unit of an exemplary work vehicle, consistent with embodiments of the present disclosure.
Figure 20:
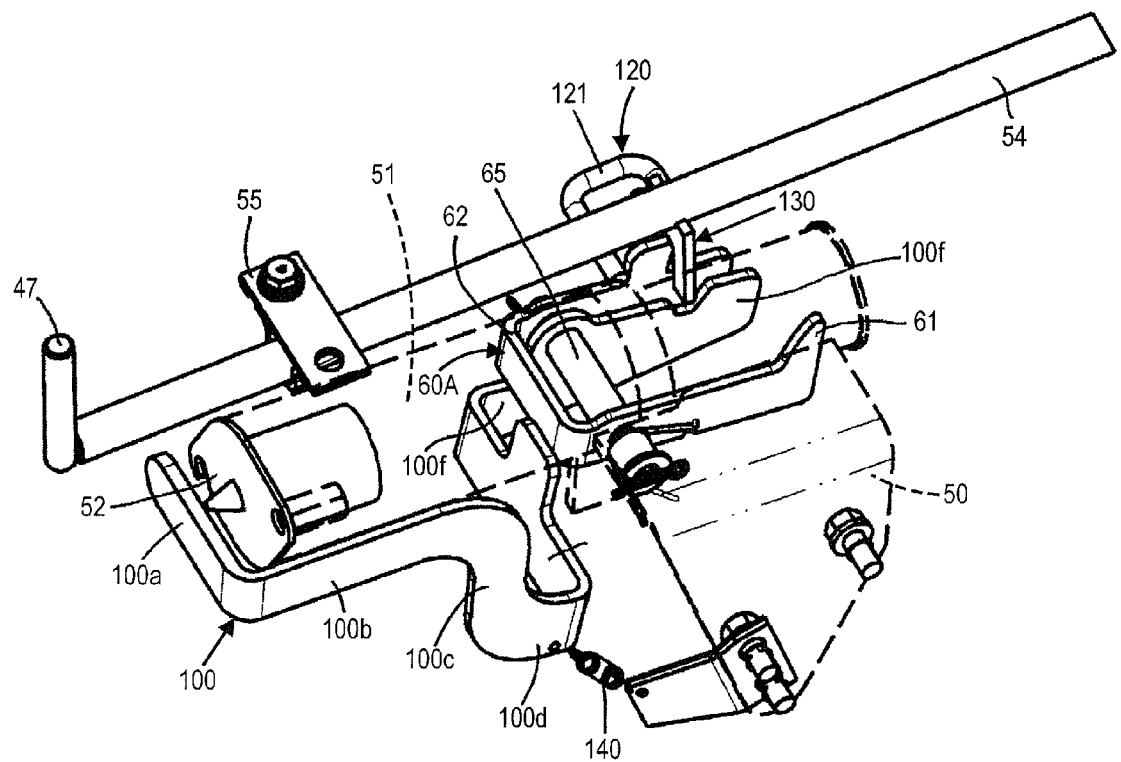
FIG. 20 is a perspective drawing of a section of a PTO transmission operation lever and a storage unit of an exemplary work vehicle, consistent with embodiments of the present disclosure, with a cylindrical case omitted from the drawing.
Figure 21:
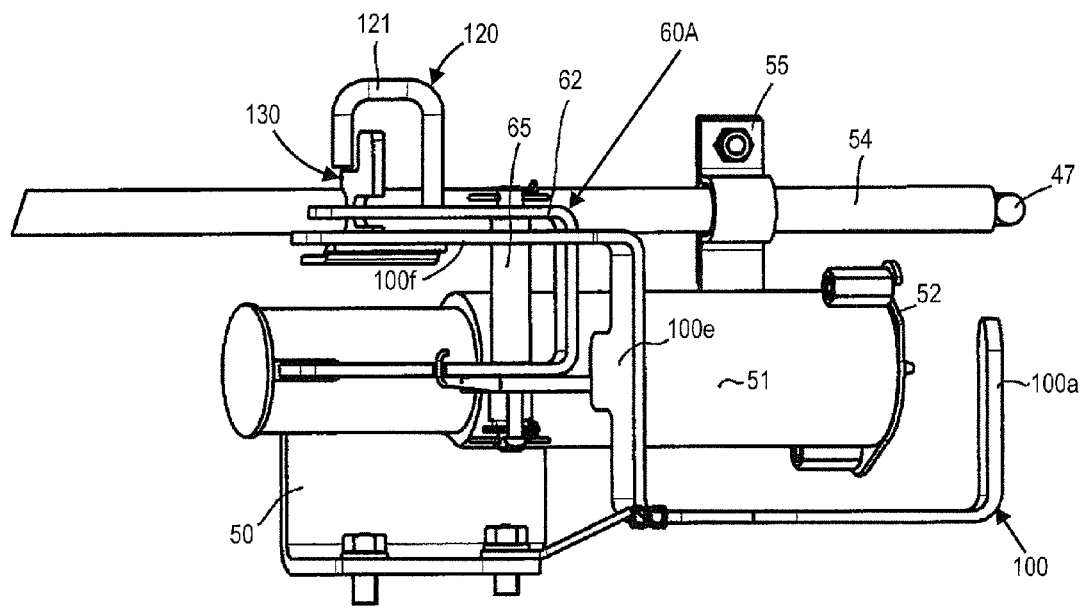
FIG. 21 is a drawing of a section of a PTO transmission operation lever and a storage unit of an exemplary work vehicle, as seen from below, consistent with embodiments of the present disclosure.
Figure 22:
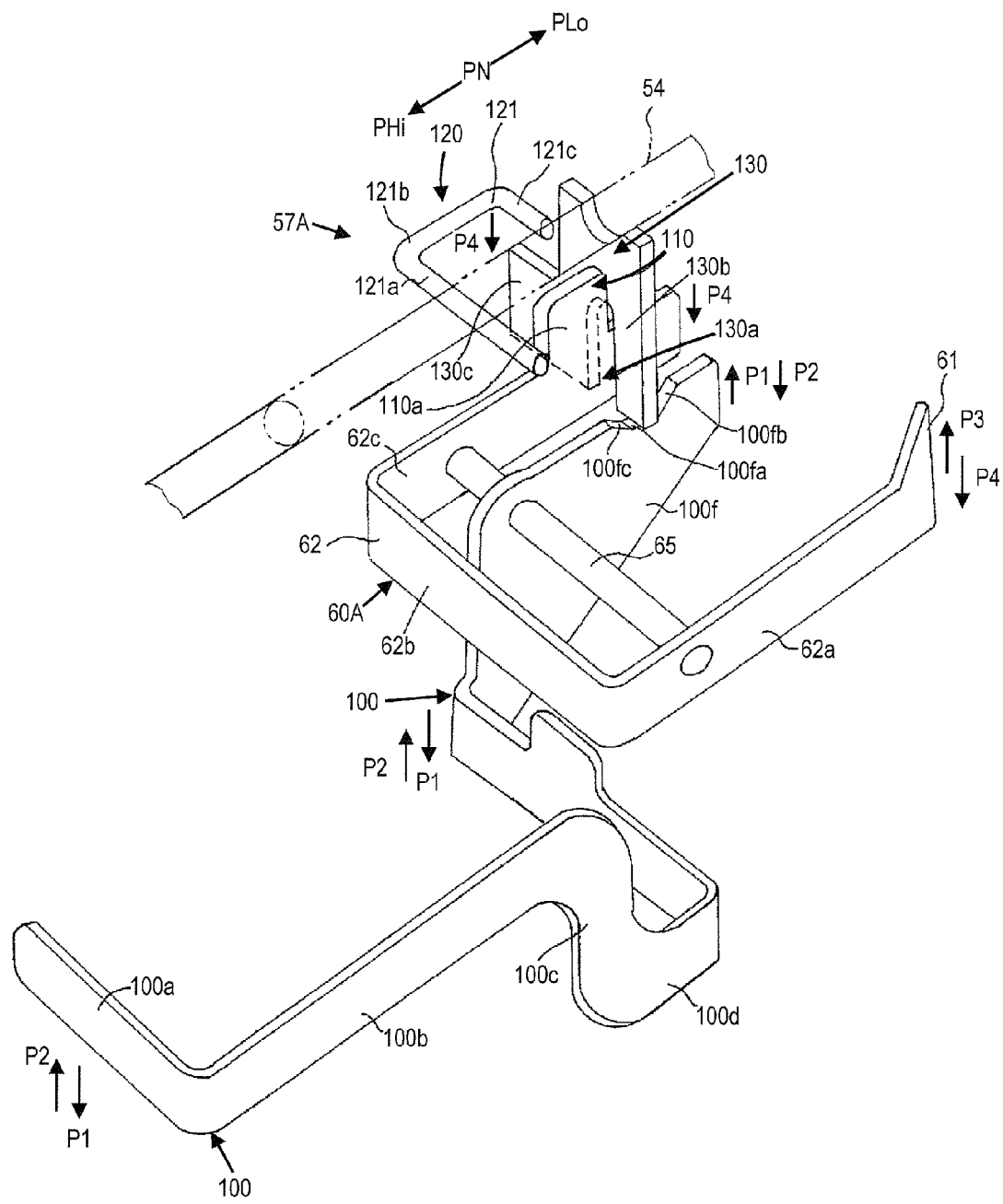
FIG. 22 is a perspective drawing of a cam member and a second transmission range varying mechanism, consistent with embodiments of the present disclosure.

Next, FIG. 19, FIG. 20, FIG. 21, and FIG. 22, consistent with some embodiments of the present disclosure, will be discussed. FIG. 19 and FIG. 20 are perspective drawings, and FIG. 21 shows a view from below (with reference to the vertical axis). In FIG. 20, cylindrical case 51 and bracket 50 are indicated with dotted lines, while the elements that are hidden by cylindrical case 51 and bracket 50 are indicated with solid lines. FIG. 22 is a perspective drawing for the purpose of illustrating the movement of a stopper plate 130, a shield plate 100, cam member 62, and other elements.

In some embodiments, shield plate 100 can be positioned behind cover 52 of cylindrical case 51 and can serve as a restricting member that prevents the PTO shaft 40 that is being stored from slipping out by a predetermined amount or greater. When a speed change is applied using PTO transmission operation lever 47, shield plate 100 is positioned rearward from the entrance of cylindrical case 51 (rearward from cover 52), within the area where PTO shaft 40 would be pulled out, thereby preventing PTO shaft 40 from slipping out. For example, shield plate 100 can be attached to pivot shaft 65 of cam member 62 of second cam mechanism 60A so that shield plate 100 is allowed to pivot. Shield plate 100 can be integrally formed from, among other things, a shield section 100a that can be projected behind cover 52, a first parallel section 100b that is positioned to the right of cylindrical case 51 and extends forward, a downwardly extended section 100c that is extended downward, a second parallel section 100d that extends forward, a left/right section 100e that extends to the left below cylindrical case 51, and a third parallel section 100f that extends forward to the left of cylindrical case 51.

Figure 23:
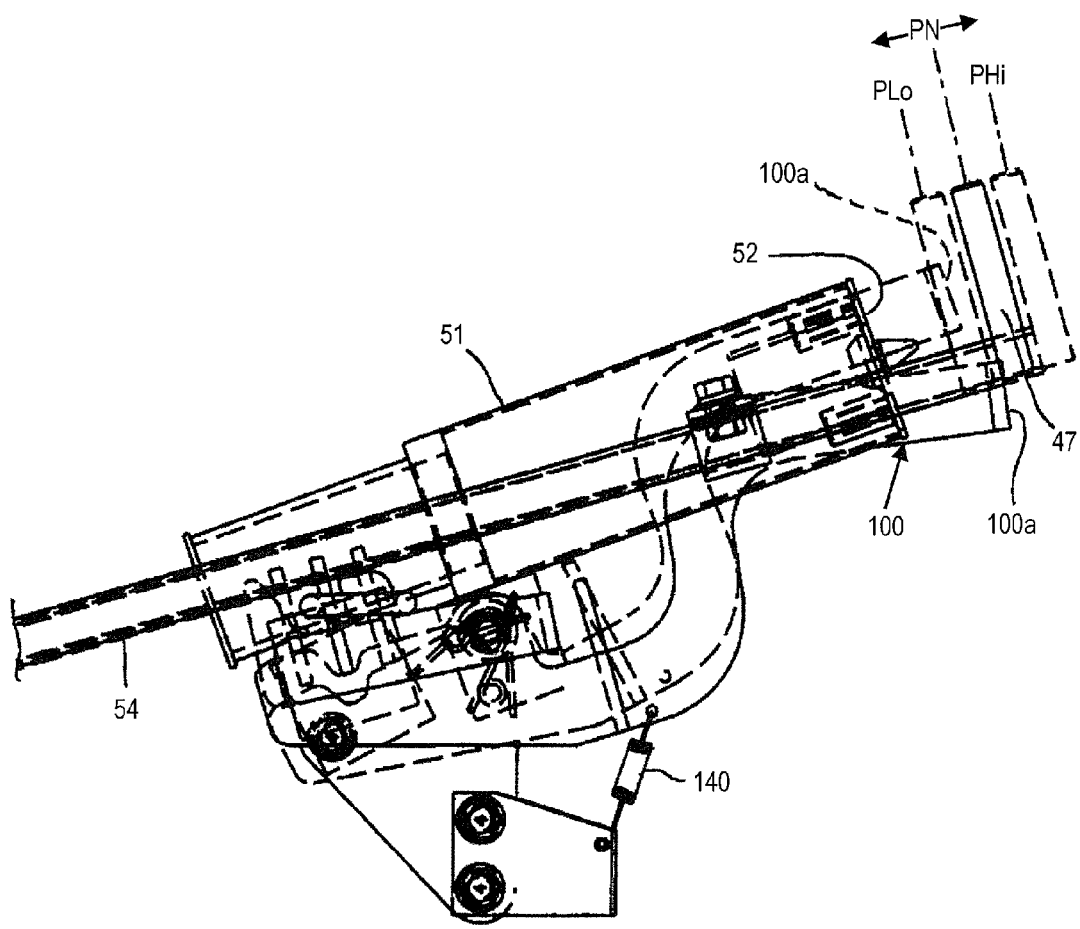
FIG. 23 is a drawing of a section of a PTO transmission operation lever and a storage unit of an exemplary work vehicle, as seen from the left side of the lateral axis of the work vehicle, consistent with embodiments of the present disclosure.

Third parallel section 100f can be provided inward from cam member 62 (toward cylindrical case 51) and can be pivotably supported by pivot shaft 65. A cavity 100fa can be formed on third parallel section 100f. An extension spring 140 is provided between second parallel section 100d of shield plate 100 and bracket 50. When PTO transmission operation lever 47 is at the neutral position PN, shield plate 100 can be biased in the direction of the arrow P1, pivoting around pivot shaft 65. Since shield section 100a of shield plate 100 is withdrawn below and behind cover 52 of cylindrical case 51 (see FIG. 23), cover 52 can be removed and first PTO shaft 43 or second PTO shaft 44 can be stored in and removed from cylindrical case 51.

A second transmission range varying mechanism 57A can be an alternative configuration of the transmission range varying mechanism 57 illustrated in FIG. 13. Second transmission range varying mechanism 57A can include, among other things, a stopper plate 130 that can serve as a fixed abutment unit, a projection 110a that can be formed on cam member 62 to serve as a first movable abutment unit 110, a pin 121 that can be formed on cam member 62 to serve as a second movable abutment unit 120, and a second cam mechanism 60A.

Stopper plate 130 serving as a fixed abutment unit corresponds to stopper plate 58 of transmission range varying mechanism 57 described above. Projection 110a formed on cam member 62 serving as first movable abutment unit 110 corresponds to movable stopper unit 59, which is the movable abutment unit of transmission range varying mechanism 57. Pin 121 that serves as second movable abutment unit 120 can be an additional element provided for the configuration of second transmission range varying mechanism 57A.

Second cam mechanism 60A can bias projection 110a formed on cam member 62 toward an abutment position and, when the end of one of the two types of PTO shafts 40 stored in storage unit 46 comes into contact with movable projection unit 61 projected inside the storage unit 46, can pivot projection 110a from the abutment position to a non-abutment position. In addition, second cam mechanism 60A can bias pin 121 formed on cam member 62 toward a non-abutment position and, when the end of one of the two PTO shafts 40 that is stored in storage unit 46 comes into contact with movable projection unit 61 that is projected into storage unit 46, pivots pin 121 from the non-abutment position to an abutment position. Second cam mechanism 60A can include cam member 62 and torque spring 63.

Cam member 62 can be formed integrally from at least three pieces: a right-side plate section 62a, a connecting plate section 62b, and a left-side plate section 62c. Left-side plate section 62c can pass through an empty space formed by a downward-facing cavity 130a formed below stopper plate 130, described below, that is integral with rod unit 54 of PTO transmission operation lever 47.

First movable abutment unit 110 and second movable abutment unit 120 can be formed on left-side plate section 62c. First movable abutment unit 110 can be formed from projection 110a, which can be formed integrally with cam member 62. Second movable abutment unit 120 can be welded integrally with left-side plate section 62c of cam member 62 and can be formed from pin 121, which can be projected in a predetermined direction. Such pin 121 can be secured by being welded rearward from projection 110a. Pin 121 can be formed, for example, from: a first left/right section 121a that extends leftward from this welded section, a front/rear section 121b that extends to the front, and a second left/right section 121c that extends to the right. Of these sections, second left/right section 121c can move in tandem with the vertical motion of cam member 62 to be positioned in front of a left stopper section 130c of stopper plate 130, described in more detail below.

As described above, cam member 62 can pivot around pivot shaft 65 and can be biased in the direction of arrow P3 by torque spring (see, for example, FIG. 13).

A fixed abutment section in the form of stopper plate 130 can be welded integrally to rod unit 54 of PTO transmission operation lever 47. Rod unit 54 can be attached to the upper portion of stopper plate 130. Downward-facing cavity 130a can be formed on the lower portion of stopper plate 130. In addition, the right side of cavity 130a can form a right stopper plate section 130b, and the left side the cavity 130a can form the left stopper section 130c.

In some embodiments, first PTO shaft 43 can be coupled to the implement by way of involute splines (21 spline) 43a and second PTO shaft 44 can be coupled to the implement by way of straight-sided splines (6 spline) 44a. Second PTO shaft 44 can be longer than first PTO shaft 43.

When the shorter first PTO shaft 43 is stored in cylindrical case 51, first PTO shaft 43 does not abut movable projection unit 61 of cam member 62. FIG. 22 shows a state in which first PTO shaft 43 is stored in cylindrical case 51 and PTO transmission operation lever 47 is set to the neutral position PN. Second PTO shaft 44 is attached to the vehicle body rear 1R of the main unit of power train 13 of transmission device 5.

In the above-described state, right stopper plate section 130b of stopper plate 130 can be positioned in cavity 100fa of third parallel section 100f of shield plate 100, and moreover, shield plate 100 can be biased in the direction of the arrow P1. As a result, the lower end of right stopper plate section 130b of stopper plate 130 can abut cavity 100fa of third parallel section 100f of shield plate 100. With regard to stopper plate 130 of rod unit 54 of PTO transmission operation lever 47, the rearward side of stopper plate 130 can abut projection 110a of first movable abutment unit 110 of cam member 62. As a result, PTO transmission operation lever 47 cannot be operated rearward, preventing the transmission from being set to a high-speed position PHi (high-speed restraining means).

Since PTO transmission operation lever 47 can be operated in the forward direction, the transmission can be set to the low-speed position PLo. Since second PTO shaft 44 coupled to the implement is coupled to the implement by way of straight-sided splines (6 spline) 44a, a high transmission torque with a low-speed rotation can be handled.

When PTO transmission operation lever 47 is operated in the forward direction, the lower end of right stopper plate section 130b of stopper plate 130 can disengage from cavity 100fa of third parallel section 100f of shield plate 100. For example, right stopper plate section 130b can move forward while abutting a sloped surface 100fb of cavity 100fa of third parallel section 100f. This can result in shield plate 100 being pivoted around pivot shaft 65 in the direction of the arrow P2. As a result, shield section 100a of shield plate 100 can be positioned rearward from cover 52 of cylindrical case 51, thus preventing first PTO shaft 43 stored in cylindrical case 51 from being removed and preventing the wrong PTO shaft from being attached to the rear side of the main unit of power train 13 of transmission device 5.

First PTO shaft 43 can be attached to the rear side of the main unit of power train 13 of transmission device 5. When the longer second PTO shaft 44 is stored in cylindrical case 51, second PTO shaft 44 can abut movable projection unit 61 of cam member 62. In this state, cam member 62 can be pivoted around pivot shaft 65 in the direction of the arrow P4. This can cause left-side plate section 62c of cam member 62 to pivot in the direction of the arrow P4 as well, leading to projection 110a of first movable abutment unit 110 being positioned in the space formed by downward-facing cavity 130a formed on stopper plate 130. As a result, stopper plate 130 may not abut projection 110a of first movable abutment unit 110.

Meanwhile, since pin 121 welded to left-side plate section 62c of cam member 62 is also pivoted in the direction of the arrow P4, second left/right section 121c of pin 121 can be positioned in front of left stopper section 130c of stopper plate 130. As a result, stopper plate 130 can abut pin 121 and cannot move forward.

When PTO transmission operation lever 47 is at the neutral position PN, right stopper plate section 130b of stopper plate 130 can be positioned in cavity 100fa of third parallel section 100f of shield plate 100, and moreover, shield plate 100 can be biased in the direction of the arrow P1. As a result, the lower end of right stopper plate section 130b of stopper plate 130 can abut cavity 100fa of third parallel section 100f of shield plate 100. With regard to stopper plate 130 of rod unit 54 of PTO transmission operation lever 47, to second left/right section 121c of pin 121 can be positioned in front of left stopper section 130c of stopper plate 130. As a result, left stopper section 130c of stopper plate 130 can abut second left/right section 121c and prevent PTO transmission operation lever 47 from being operated in the forward direction, thus preventing the transmission to be set to the low-speed position PLo (low-speed restraining means). Since PTO transmission operation lever 47 can be operated in the rearward direction, the transmission can be set to the high-speed position PHi. As a result, the transmission torque can be prevented from becoming high, and the transmission torque can be handled by first PTO shaft 43, which can be coupled to the implement by way of involute splines (21 spline) 43a.

When PTO transmission operation lever 47 is operated rearward, the lower end of right stopper plate section 130b of stopper plate 130 can disengage from cavity 100fa of third parallel section 100f of shield plate 100. More specifically, right stopper plate section 130b can move rearward while abutting a sloped surface 100fc of cavity 100fa of third parallel section 100f. This can cause shield plate 100 to pivot around pivot shaft 65 in the direction of the arrow P2. As a result, since shield section 100a (indicated by dotted lines in FIG. 23) of shield plate 100 is positioned rearward from the entrance of cylindrical case 51 and is positioned rearward from cover 52, second PTO shaft 44 stored in cylindrical case 51 can be prevented from being removed, which prevents the wrong PTO shaft from being attached to the rear side of the main unit of power train 13 of transmission device 5.

As described above, when the shorter first PTO shaft 43 is stored in cylindrical case 51, first PTO shaft 43 may not abut movable projection unit 61 of to cam member 62. More specifically, attachment end 43b opposite from straight-sided splines (6 spline) 43a may not abut movable projection unit 61 of cam member 62. The positioning of first PTO shaft 43 can be determined by the abutment of large-diameter section 43c of first PTO shaft 43 against small-diameter section 51a in cylindrical case 51. This exemplary state is illustrated in FIG. 17.

Figure 24:
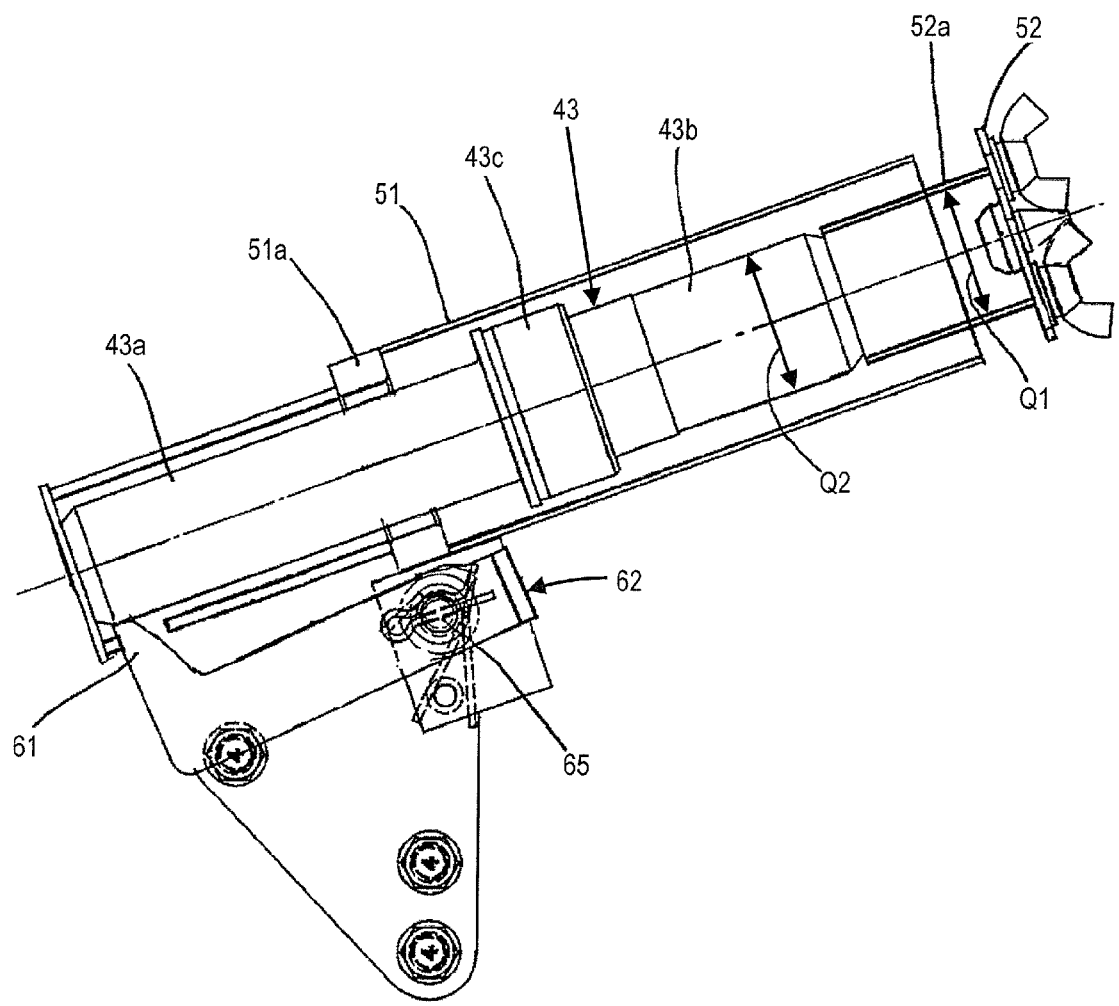
FIG. 24 is a drawing of a storage unit of an exemplary work vehicle, as seen from the left side of the lateral axis of the work vehicle, consistent with embodiments of the present disclosure.

However, in comparing the length from large-diameter section 43c of first PTO shaft 43 to the end of attachment end 43b and the length from large-diameter section 43c of first PTO shaft 43 to the end of straight-sided splines (6 spline) 43a, the length from large-diameter section 43c of first PTO shaft 43 to the end of straight-sided splines (6 spline) 43a can be longer. As a result, inserting first PTO shaft 43 in cylindrical case 51 from the end with straight-sided (6 spline) splines 43a can lead to a problem wherein the end of straight-sided splines (6 spline) 43a abuts movable projection unit 61 of cam member 62 while large-diameter section 43c of first PTO shaft 43 is not abutted against small-diameter section 51a of cylindrical case 51. To overcome this problem, in some embodiments, cover 52 does not close if first PTO shaft 43 is stored in cylindrical case 51 from the end with straight-sided (6 spline) splines 43a. This state is illustrated in the cross-section drawing in FIG. 24.

A cylindrical section 52a can be formed on cover 52, with the inner diameter of cylindrical section 52a being Q1, and the diameter of attachment end 43b of first PTO shaft 43 being Q2. When Q1<Q2, cylindrical section 52a of cover 52 abuts attachment end 43b of first PTO shaft 43, preventing cover 52 from closing. As a result, it is possible to prevent mistakes in insertion. The cover 52 can be closed by setting the inner diameter of the cylindrical section 52a of the cover 52 to be smaller than Q1.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A work vehicle comprising:
   a first PTO shaft and a second PTO shaft, the first and second PTO shafts being removably mounted to a vehicle body rear structure and fitted to a power receiving unit on an implement side;
   a PTO drive mechanism comprising a PTO transmission mechanism, the PTO drive mechanism transmitting rotational power from a power source to the first PTO shaft;
   a storage unit storing the second PTO shaft;
   a PTO transmission operation lever allowing a transmission operation to be performed on the PTO transmission mechanism, wherein the PTO transmission operation lever and the storage unit are provided in the vehicle body rear structure; wherein when the transmission operation is performed, the PTO transmission operation lever can be moved in tandem with a rod unit extended along an axis of the transmission operation; and
   a transmission range varying mechanism that, when the first PTO shaft is being used, defines a transmission range for the PTO transmission mechanism based on the second PTO shaft, wherein the transmission range varying mechanism comprises:
      a fixed abutment unit provided on the rod unit,
      a movable abutment unit being pivotable between an abutment position in which the movable abutment unit can abut the fixed abutment unit, and a non-abutment position in which the movable abutment unit is positioned away from the abutment position, and
      a cam mechanism that biases the movable abutment unit toward the abutment position and pivots the movable abutment unit from the abutment position to the non-abutment position when an end of one of the first and second PTO shafts comes into contact with a movable projection unit projected into the storage unit; and
   the movable abutment unit being positioned at the abutment position and the movable abutment unit abutting the fixed abutment unit causes the transmission operation performed by the PTO transmission operation level to be restricted, and restricts the transmission range of the PTO transmission mechanism.

2. The work vehicle of claim 1, wherein the storage unit is formed from a cylindrical case, the work vehicle further comprising:
   a restricting member that can be positioned rearward from an entrance of the cylindrical case to prevent the second PTO shaft from slipping out by at least a predetermined amount, wherein the restricting member is retracted when the PTO transmission operation lever is at a neutral position as a result of the transmission operation, and the restricting member moves to a position that prevents the second PTO shaft from slipping out when the PTO transmission operation lever is at a transmission operation position as a result of the transmission operation.

3. The work vehicle of claim 1, wherein the storage unit is supported by a securing unit, the work vehicle further comprising a PTO transmission means that is supported by the storage unit.

4. A work vehicle comprising:
   a first PTO shaft and a second PTO shaft, the first and second PTO shafts being removably mounted to a vehicle body rear structure and fitted to a power receiving unit on an implement side;
   a PTO drive mechanism comprising a PTO transmission mechanism, the PTO drive mechanism transmitting rotational power from a power source to the first PTO shaft;
   a storage unit storing the second PTO shaft;
   a PTO transmission operation lever allowing a transmission operation to be performed on the PTO transmission mechanism, wherein the PTO transmission operation lever and the storage unit are provided in the vehicle body rear structure, wherein when the transmission operation is performed, the PTO transmission operation lever can be moved in tandem with a rod unit extended along an axis of the transmission operation; and a transmission range varying mechanism that, when the first PTO shaft is being used, defines a transmission range for the PTO transmission mechanism based on the second PTO shaft, wherein the transmission range varying mechanism comprises:
   a fixed abutment unit provided on the rod unit,
   a first movable abutment unit being pivotable between an abutment position in which the first movable abutment unit can abut the fixed abutment unit, and a non-abutment position in which the first movable abutment unit is positioned away from the abutment position,
   a second movable abutment unit being pivotable between an abutment position in which the second movable abutment unit can abut the fixed abutment unit, and a non-abutment position in which the second movable abutment unit is positioned away from the abutment position, and
   a second cam mechanism that biases the first movable abutment unit toward the abutment position, biases the second movable abutment unit toward the non-abutment position, pivots the first movable abutment unit from the abutment position to the non-abutment position, and pivots the second movable abutment unit from the abutment position to the non-abutment position when an end of one of the first and second PTO shafts comes into contact with a movable projection unit projected into the storage unit;
the first movable abutment unit being positioned at the abutment position and the first movable abutment unit abutting the fixed abutment unit causes the transmission operation performed by the PTO transmission operation lever to be restricted and restricts the transmission range of the PTO transmission mechanism; and
the second movable abutment unit being positioned at the abutment position and the second movable abutment unit abutting the fixed abutment unit causes the transmission operation performed by the PTO transmission operation lever to be restricted and restricts the transmission range of the PTO transmission mechanism.

5. The work vehicle of claim 4, wherein the storage unit is formed from a cylindrical case, the work vehicle further comprising:
   a restricting member that can be positioned rearward from an entrance of the cylindrical case to prevent the second PTO shaft from slipping out by at least a predetermined amount, wherein the restricting member is retracted when the PTO transmission operation lever is at a neutral position as a result of the transmission operation, and the restricting member moves to a position that prevents the second PTO shaft from slipping out when the PTO transmission operation lever is at a transmission operation position as a result of the transmission operation.

6. The work vehicle of claim 4, wherein the storage unit is supported by a securing unit, the work vehicle further comprising a PTO transmission means that is supported by the storage unit.

7. A work vehicle comprising:
a first PTO shaft and a second PTO shaft, the first and second PTO shafts being removably mounted to a vehicle body rear structure and fitted to a power receiving unit on an implement side;
a PTO drive mechanism comprising a PTO transmission mechanism, the PTO drive mechanism transmitting rotational power from a power source to the first PTO shaft;
a storage unit storing the second PTO shaft, wherein the storage unit is formed from a cylindrical case;
a PTO transmission operation lever allowing a transmission operation to be performed on the PTO transmission mechanism, wherein the PTO transmission operation lever and the storage unit are provided in the vehicle body rear structure; and
a restricting member that can be positioned rearward from an entrance of the cylindrical case to prevent the second PTO shaft from slipping out by at least a predetermined amount, wherein the restricting member is retracted when the PTO transmission operation lever is at a neutral position as a result of the transmission operation, and the restricting member moves to a position that prevents the second PTO shaft from slipping out when the PTO transmission operation lever is at a transmission operation position as a result of the transmission operation.

8. A work vehicle comprising:
a first PTO shaft and a second PTO shaft, the first and second PTO shafts being removably mounted to a vehicle body rear structure and fitted to a power receiving unit on an implement side;
a PTO drive mechanism comprising a PTO transmission mechanism, the PTO drive mechanism transmitting rotational power from a power source to the first PTO shaft;
a storage unit storing the second PTO shaft, wherein the storage unit is formed from a cylindrical case;
a PTO transmission operation lever allowing a transmission operation to be performed on the PTO transmission mechanism, wherein the PTO transmission operation lever and the storage unit are provided in the vehicle body rear structure;
a transmission range varying mechanism that, when the first PTO shaft is being used, defines a transmission range for the PTO transmission mechanism based on the second PTO shaft; and
a restricting member that can be positioned rearward from an entrance of the cylindrical case to prevent the second PTO shaft from slipping out by at least a predetermined amount, wherein the restricting member is retracted when the PTO transmission operation lever is at a neutral position as a result of the transmission operation, and the restricting member moves to a position that prevents the second PTO shaft from slipping out when the PTO transmission operation lever is at a transmission operation position as a result of the transmission operation.

* * * * *